United States Patent
Leung et al.

(10) Patent No.: US 12,504,371 B2
(45) Date of Patent: Dec. 23, 2025

(54) SYSTEM AND METHOD OF DYNAMIC MICRO-OPTICAL COHERENCE TOMOGRAPHY FOR MAPPING CELLULAR FUNCTIONS

(71) Applicant: The General Hospital Corporation, Boston, MA (US)

(72) Inventors: Hui Min Leung, Boston, MA (US); Guillermo J. Tearney, Boston, MA (US); Andreas Wartak, Boston, MA (US)

(73) Assignee: The General Hospital Corporation, Boston, MA (US)

( * ) Notice: Subject to any disclaimer, the term of this patent is extended or adjusted under 35 U.S.C. 154(b) by 411 days.

(21) Appl. No.: 17/995,641

(22) PCT Filed: Apr. 6, 2021

(86) PCT No.: PCT/US2021/025863
§ 371 (c)(1),
(2) Date: Oct. 6, 2022

(87) PCT Pub. No.: WO2021/207118
PCT Pub. Date: Oct. 14, 2021

(65) Prior Publication Data
US 2023/0280271 A1    Sep. 7, 2023

Related U.S. Application Data

(60) Provisional application No. 63/157,432, filed on Mar. 5, 2021, provisional application No. 63/126,454, filed
(Continued)

(51) Int. Cl.
*G01N 21/47*    (2006.01)

(52) U.S. Cl.
CPC .  *G01N 21/4795* (2013.01); *G01N 2021/4735* (2013.01); *G01N 2021/4797* (2013.01); *G01N 2201/126* (2013.01)

(58) Field of Classification Search
CPC ....... G01N 21/4795; G01N 2021/4735; G01N 2021/4797; G01N 2201/126;
(Continued)

(56) References Cited

U.S. PATENT DOCUMENTS 9,823,127 B2 *  11/2017  Wax ................... G01B 9/02091
2009/0079993 A1 *  3/2009  Yatagai ............... A61B 5/7257
356/497

(Continued)

FOREIGN PATENT DOCUMENTS

WO    2021207118 A1    10/2021

OTHER PUBLICATIONS

International Search Report and Written Opinion for issued for corresponding Application No. PCT/US2021/025863 issued Jul. 15, 2021.

(Continued)

*Primary Examiner* — Catherine T. Rastovski
*Assistant Examiner* — Matthew W. Baca
(74) *Attorney, Agent, or Firm* — QUARLES & BRADY LLP

(57) ABSTRACT

An apparatus for obtaining image data and functional data from a biological sample, the apparatus including: an interferometer configured to acquire interferometric information at a plurality of time points along an imaging plane for which at least one axis of the plane is at least partially along a depth or axial dimension that is based on radiations provided from a reference interfered with by the biological sample; and a processor configured to receive the interferometric information from the interferometer and configured (Continued)

to: process the interferometric information to generate an image of the biological sample along the imaging plane; determine frequency information based on the plurality of time points of the interferometric information, the frequency information reflecting temporal modulations induced by dynamic functions of the biological sample; generate a spatial map of the frequency information, and the spatial map of the frequency information indicating the dynamic functions of the biological sample.

20 Claims, 16 Drawing Sheets

Related U.S. Application Data on Dec. 16, 2020, provisional application No. 63/005,676, filed on Apr. 6, 2020.

(58) Field of Classification Search
CPC ... A61B 5/0071; A61B 5/7267; A61B 5/0022; A61B 5/0075; A61B 5/725; A61B 5/7257; A61B 5/0066; A61B 5/743; A61B 5/7435; G01B 9/02004; G01B 9/02091; G16H 50/70; G16H 10/40; G16H 20/10; G16H 30/40; G16H 40/67; G16H 50/20; G16H 10/20; G06T 7/0012; G06T 7/0016
See application file for complete search history.

(56) References Cited

U.S. PATENT DOCUMENTS

| | | | |
|---|---|---|---|
| 2012/0302862 A1 | 11/2012 | Yun et al. | |
| 2018/0028079 A1 | 2/2018 | Gurevich et al. | |
| 2018/0055355 A1* | 3/2018 | Sarunic | A61B 3/1241 |
| 2018/0120550 A1 | 5/2018 | Boccara et al. | |
| 2020/0046283 A1 | 2/2020 | Tearney et al. | |
| 2020/0245905 A1 | 8/2020 | Chen et al. | |
| 2021/0019881 A1* | 1/2021 | Wu | G06T 7/0012 |
| 2021/0199584 A1* | 7/2021 | Chang | G06T 3/4038 |
| 2021/0310788 A1* | 10/2021 | Zawadzki | G01B 9/0201 |

OTHER PUBLICATIONS

Leung et al., "Applications of Dynamic Micro-Optical Coherence Tomography," SPIE Photonics West BiOS, 2021.
Leung et al., "Imaging Intracellular Motion with Dynamic Micro-Optical Coherence Tomography," Biomedical Optics Express, vol. 11, No. 5, May 1, 2020.
Munter, M. et al., Dynamic Contrast in Scanning Microscopic OCT, arXiv:2003.00006, Feb. 28, 2020, 7 pages.
Yang, L. et al., Characterizing Optical Coherence Tomography Speckle Fluctuation Spectra of Mammary Organoids During Suppression of Intracellular Motility, Quantitative Imaging in Medicine and Surgery, 2020, 10(1):76-85.
European Patent Office, Extended Search Report, Application No. 21785045.2, Feb. 26, 2024, 10 pages.
Chang, Shoude, et al. "Attenuation compensation for optical coherence tomography imaging." Optics Communications 282.23 (2009): 4503-4507.
Communication Pursuant to Article 94(3) EPC in European Application No. EP21785045.2; received on Sep. 23, 2025.

* cited by examiner

SYSTEM AND METHOD OF DYNAMIC MICRO-OPTICAL COHERENCE TOMOGRAPHY FOR MAPPING CELLULAR FUNCTIONS

CROSS REFERENCE TO RELATED APPLICATIONS

The present application is a U.S. National Phase of International Application PCT/US2021/025863, filed Apr. 6, 2021, which relates to is based on and claims priority from U.S. Patent Application Ser. No. 63/005,676, filed on Apr. 6, 2020, U.S. Patent Application Ser. No. 63/126,454, filed Dec. 16, 2020, and U.S. Patent Application Ser. No. 63/157,432, filed Mar. 5, 2021. Each of the preceding patent applications are incorporated herein by reference in their entireties.

STATEMENT REGARDING FEDERALLY SPONSORED RESEARCH

N/A

BACKGROUND OF THE INVENTION

The microscopic study of cells in tissue is central to the understanding and diagnosis of disease. Historically, the focus has been on identifying static cellular phenotypes and morphology. This standard approach sometimes misses important opportunities to determine the phenotype of cells based on properties such as intracellular molecular movements that can reflect function, such as activation or proliferative state. Certain fluorescence microscopy techniques, phase contrast microscopy, and single-cell interferometric microscopies are often used to explore intracellular motility, but they cannot be readily used in tissue or patients.

SUMMARY OF THE INVENTION

Accordingly, exemplary embodiments of the present disclosure relate to methods, systems, arrangements and computer-accessible medium for providing micro-optical coherence tomography procedures, and more particularly to exemplary methods, systems, arrangements, and computer-accessible medium for mapping cellular functions with high spatial and temporal resolution.

Cross-sectional reflectance imaging technologies obtain information that arises from scattering from refractive index interfaces within tissue. Since these refractive index gradients are small and inconsistent, reflectance imaging often suffers from low contrast. Disclosed herein are systems for and methods of analyzing the motion of particles inside tissue, imaged at subcellular resolution, to provide an additional means of contrast. In addition, the motion of particles provides information on the dynamic properties of tissue, which informs on function and metabolism.

Metabolism gives rise to molecular and organelle movement caused by intracellular processes which can be different from thermal-driven Brownian motion. The molecular motion from these processes causes signal fluctuations in the micro-optical coherence tomography (μOCT) images. By recording these fluctuations in a cross-sectional imaging plane or in three dimensions and subsequently extracting the temporal frequency information, a frequency map that may be superimposed onto the morphological image can be obtained. Based on the differences in the frequency content between different organelles and cell types, this technology enables the delineation of microscopic features in living tissue in a technology termed dynamic μOCT (d-μOCT).

Dynamic-μOCT has been applied to human biopsies and chemotherapy-treated tumors grown in mouse models. In human biopsies, it is possible to use d-μOCT to distinguish microscopic features (e.g. cell nuclei, organelles, and cell membranes), cellular structures (e.g. squamous, glandular, inflammatory cells), and different cell types that were not evident in corresponding regular μOCT images. Ex vivo experiments were also performed using tumors grown with human cell lines. Custom microdevices containing small amounts of chemotherapeutic drugs were inserted into the tumors. For example, effects of intra-tumoral apoptosis were distinguished with d-μOCT and confirmed with histology images stained with cleaved caspase-3 (CC3), an apoptosis marker.

To study such tissue motion, other reported methods either utilized non-OCT techniques (e.g. particle tracking in cell cultures), OCT in the en face (transverse) plane, parallel to the tissue's surface, or the use of lower resolution forms of OCT that cannot resolve cells. Therefore, d-μOCT is the only optical imaging technology that offers sub-cellular resolution imaging in the cross-sectional imaging plane that enables the dynamics of individual cells in whole tissue to be studied.

Features of the device and procedures which facilitate the improved results obtained herein include, but are not limited to, the development and use of: dynamic cross-sectional imaging to uncover metabolic activity of individual cells; algorithms for determining the frequency content of the intracellular, cellular, and extracellular motion; and display methods for visualizing the frequency content in a manner that differentiates unique tissue constituents.

In certain embodiments, the disclosed benchtop d-μOCT apparatus and methods may be adapted to a probe-based imaging system that can allow clinical assessment of cellular dynamics in human subjects. One application will be to incorporate this with the intra-tumoral microdevices loaded with different chemotherapies and evaluating efficacies of different drugs on a per-patient basis. This will speed up the time to determine the best treatment for individuals. In another application, d-μOCT probes can be inserted into the human body to diagnose disease without excising tissue. In yet another embodiment, d-μOCT can be used externally to obtain microscopic images of skin.

It is further expected that the added information about cell function provides better diagnostic value than either traditional biopsies or optical biopsies conducted using regular μOCT and can be used as a surveillance tool on subjects with high-risk of developing diseases.

In one embodiment, the disclosure provides an apparatus for obtaining image data and functional data from biological tissue, including tissue in vivo, excised tissue, three-dimensional cell cultures, spheroids, organoids, or the like. The apparatus includes: an interferometer to acquire interferometric information along an imaging plane that contains at least one tissue-depth-resolved axis that is based on radiations provided from a reference interfered with radiations returning from the biological tissue, a processor configured to receive the interferometric information from the interferometer and configured to: process the interferometric information to generate a morphological image of the biological tissue along the imaging plane; determine frequency information from temporal modulations of the interferometric information induced by dynamic functions of the biological tissue; and generate a report that spatially maps the dynamic functions of the biological tissue independently or combined with the standard morphological image.

In another embodiment, the disclosure provides a method for obtaining image data and functional data from biological tissue, the method including: acquiring interferometric information along an imaging plane that contains at least one tissue-depth-resolved axis that is based on radiations provided from a reference interfered with radiations returning from the biological tissue, processing the interferometric information to generate a morphological image of the biological tissue along the imaging plane; determining frequency information from temporal modulations of the interferometric information induced by dynamic functions of the biological tissue; and generating a report that spatially maps the dynamic functions of the biological tissue that may be combined with the morphological image.

In another embodiment the disclosure provides a system and method for improved spatial resolution for d-µOCT. Improved spatial resolution is described by using sub-pixel sampling methods, bulk subpixel motion, and optical aliasing. Higher spatial resolution enables more detail to be visualized inside of cells. This embodiment takes advantage of inherent motion of tissue that is at least partially independent of the molecular/organelle motion (e.g., patient motion, tissue hydration, or mechanically induced motion of the specimen). Such motion allows each of the images within the sequence of µOCT images to be acquired from a different perspective, enabling subpixel resolution to be attained, while maintaining the d-µOCT information.

In another embodiment the disclosure provides a system and method for improved temporal resolution for d-µOCT. Temporal resolution is increased by using Fourier Transform spectral extrapolation methods. Higher temporal resolution allows finer frequency resolution in low frequency motion ranges where the bulk of intracellular transport takes place. This advancement will allow better discrimination of cells and cellular activity based on intracellular motion frequency signatures.

In another embodiment the disclosure provides a system and method for single scan d-µOCT imaging. Currently, d-µOCT images takes many seconds to acquire, challenging implementation in vivo owing to motion artifacts. A method that uses spatially offset beams and simultaneous phase acquisition allows d-µOCT to be conducted in a single scan. This technology will allow d-µOCT to be conducted in living organisms that move using hand held probes or small diameter flexible probes inside the body.

In certain embodiments the disclosure provides an apparatus for obtaining image data and functional data from a biological sample, the apparatus including: an interferometer configured to acquire interferometric information at a plurality of time points along an imaging plane for which at least one axis of the plane is at least partially along a depth or axial dimension that is based on radiations provided from a reference interfered with by the biological sample; and a processor configured to receive the interferometric information from the interferometer and configured to: process the interferometric information to generate an image of the biological sample along the imaging plane; determine frequency information based on the plurality of time points of the interferometric information, the frequency information reflecting temporal modulations induced by dynamic functions of the biological sample; generate a spatial map of the frequency information, and the spatial map of the frequency information indicating the dynamic functions of the biological sample.

In other embodiments the disclosure provides a method for obtaining image data and functional data from a biological sample, the method including: acquiring, using an interferometer, interferometric information at a plurality of time points along an imaging plane that is based on radiations provided from a reference interfered with by the biological sample, at least one axis of the plane being at least partially along a depth or axial dimension; processing, using a processor configured to receive the interferometric information from the interferometer, the interferometric information to generate an image of the biological sample along the imaging plane; determining, using the processor, frequency information based on the plurality of time points of the interferometric information, the frequency information reflecting temporal modulations induced by dynamic functions of the biological sample; generating, using the processor, a spatial map of the frequency information with the image, the spatial map of the frequency information indicating the dynamic functions of the biological sample.

In yet other embodiments, the disclosure provides an apparatus for obtaining image data and functional data from a sample, the apparatus including: an interferometer to acquire interferometric information along an imaging plane that is based on radiations provided from a reference interfered with by the sample, at least one axis of the plane being at least partially along a depth or axial dimension; and a processor configured to receive the interferometric information from the interferometer and configured to: process the interferometric information to generate an image of the sample along the imaging plane; and perform a frequency analysis of temporal fluctuations arising from the sample, the analysis including: determining spectral information for the interferometric information, binning the spectral information into a plurality of frequency ranges, and generating a pseudo-color composite image including different colors corresponding to each of the plurality of frequency ranges, the composite image including contrasting portions corresponding to differences in intracellular motion within the sample.

In still other embodiments, the disclosure provides an apparatus for obtaining image data and functional data from a biological sample, the apparatus including: an interferometer configured to acquire interferometric information at a plurality of time points along an imaging plane that is based on radiations provided from a reference interfered with by the biological sample, at least one axis of the plane being at least partially along a depth or axial dimension, and a processor configured to receive the interferometric information from the interferometer and configured to: process the interferometric information to generate an image of the biological sample along the imaging plane, the image including a plurality of pixels; and estimate a frequency spectrum for each of the plurality of pixels by employing time frequency analysis of temporal modulations of the interferometric information acquired at the plurality of time points, the temporal modulations being induced by dynamic functions of the biological sample; and generate a report that spatially maps the dynamic functions of the biological sample with the image.

In other embodiments, the disclosure provides a method for obtaining image data and functional data from a biological sample, the method including: acquiring, using an interferometer, interferometric information at a plurality of time points along an imaging plane, at least one axis of the plane being at least partially along a depth or axial dimension, and the interferometric information being based on radiations provided from a reference interfered with by the biological sample; processing, using a processor configured to receive the interferometric information from the interferometer, the interferometric information to generate an image of the biological sample along the imaging plane; determining, using the processor, frequency information based on the plurality of time points of the interferometric information using a dimension reduction analysis, the frequency information reflecting temporal modulations induced by dynamic functions of the biological sample; generating, using the processor, a spatial map of the frequency information with the image, the spatial map of the frequency information indicating the dynamic functions of the biological sample.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
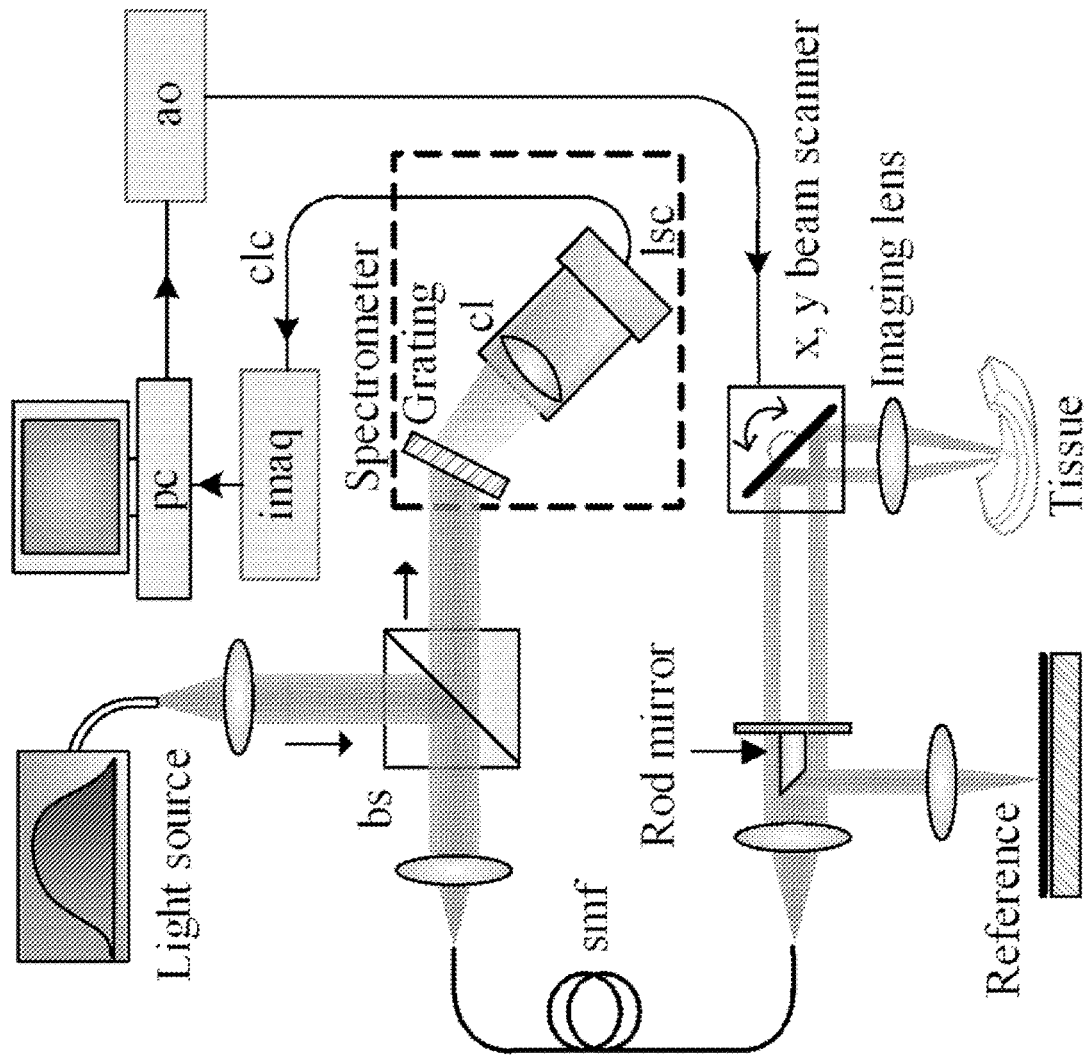
FIG. 1 shows a μOCT instrumentation setup for use with various disclosed embodiments, where: ao: analog output board; bs: beam splitter; imaq: image acquisition board; cl: camera lens; lsc: line scan camera; smf: single mode fiber; pc: personal computer; clc: camera link cables.

Disclosed herein are embodiments of procedures that use high-resolution (e.g. 1-μm axial resolution) micro-optical coherence tomography (μOCT) to obtain cross-sectional images of intracellular dynamics with dramatically enhanced image contrast. Embodiments of these procedures, termed dynamic OCT (d-μOCT), are accomplished by acquiring time series of μOCT images and conducting power frequency analyses of the temporal fluctuations that arise from intracellular motion separately or individually within subregions of the sample, e.g. on a pixel-per-pixel or voxel-by-voxel basis. Results of d-μOCT imaging of freshly excised human esophageal and cervical biopsy samples are disclosed herein. Depth-resolved d-μOCT images of intact tissue show that intracellular dynamics provides a new contrast mechanism for μOCT that highlights subcellular morphology and activity in epithelial surface maturation patterns. In another embodiment, d-μOCT images are obtained by computing the changes in radiation phase at different time points at approximately the same location in the sample.

Despite significant advances in microscopy, many techniques currently in use obtain static images of cells. Imaging living cells opens up a new, functional dimension of evaluation, where organelle and intracellular molecular movements inform on pathophysiology in a manner that cannot be achieved by static snapshots in time. The use of fluorescence microscopy to track either fluorescently transfected organelles or actively perturbed microinjected fluorescent particles within cells are examples of recent techniques that probe intracellular dynamics. In addition to perturbing the biological system by adding exogenous labels, challenges related to the interrogation of a large ensemble of cells have hindered the scaling of these methodologies for studying intact tissue samples where heterogeneous cell populations exist.

Thus, in various embodiments the disclosed apparatus, systems, and methods provide improvements over current technology, including improvements in the fields of biological monitoring and diagnostics. The disclosed procedures facilitate monitoring of cellular/intracellular structures in live cells and tissues without having to introduce exogenous labels which, besides adding many practical hurdles, could perturb the cells or tissues and potentially alter the results.

Coherence-gating imaging techniques are microscopy approaches that overcome many of these limitations. Coherence-gating imaging techniques do not require the addition of labels, as they derive their image contrast from tissue reflectivity at refractive index interfaces within the sample. Yet, small variations in refractive indices within cells cause minute reflectivity changes that are difficult to ascertain in a single image; thus, images have relatively low contrast. By taking advantage of the differences in the motion of various subcellular compartments, temporo-spatial signal analysis can be used to significantly enhance intracellular visualization, for example in dynamic full-field optical coherence tomography (FFOCT). FFOCT employs a high-power microscope objective and low coherence optical interferometry to acquire high-resolution transverse (en face) images of natural tissue reflectance at a given depth. Through computation of the standard deviation or autocorrelation of time-dependent signals that arise from intracellular activity, en face dynamic FFOCT images can reveal clear intracellular features that may otherwise be obscured in static images.

While dynamic FFOCT can provide a new method for label-free cellular imaging, this technique is limited in that it acquires images in the transverse plane. It would be much more desirable to obtain depth-resolved, cross-sectional images, as many important tissues (e.g. epithelial tissues) mature vertically and aberrations in this maturation process are critical for disease understanding and diagnosis. Optical coherence tomography (OCT) is a 10-μm-resolution coherence-gated imaging technique that obtains cross-sectional images of tissue. Similar to dynamic FFOCT, dynamic OCT measures changes in cross-sectional OCT images taken at the same location over time. Dynamic OCT has shown to inform on tissue viability, mucus viscosity, cell migration, and remodeling. Nonetheless, due to its relatively low spatial resolution, dynamic OCT cannot be used to see inside individual cells.

Disclosed herein is a new technology termed dynamic micro-optical coherence tomography (d-μOCT). μOCT is a very high-resolution form of OCT that has resolutions of approximately 2×2 μm (lateral)×1 μm (axial) or alternatively approximately 4×4 μm (lateral)×2 μm (axial). μOCT has been shown to be capable of visualizing cross-sectional images of cells at an unprecedented level of detail. With d-μOCT, new microscopic information and enhanced contrast emerge by conducting power frequency analysis of the temporal fluctuations that arise from intracellular motion on a pixel-per-pixel basis. Because d-μOCT has a depth scan priority, it can uniquely probe subcellular dynamics over a very wide (0-100, 0-1000, 0-10000, 0-100000 Hz) frequency range. Results using d-μOCT are demonstrated using biopsy samples, spheroids, excised mouse tumor tissue, etc. showing that it highlights depth-resolved, intracellular dynamics of intact tissues, a potentially impactful capability for the biomedical sciences and clinical diagnosis.

In various embodiments, the methods disclosed herein may be carried out using a μOCT apparatus such as that shown in FIG. 1. OCT measures the electric field amplitude of light that is elastically scattered from within tissue in three dimensions. Depth or axial (z) ranging is achieved by interferometric measurement of the optical delay of light returned from the sample. In various embodiments, μOCT may be based on spectral-domain OCT (SD-OCT), which involves parallel detection of spectral interference between light scattered at all depths and a reference, followed by Fourier analysis to obtain a depth-resolved scattering profile. In certain embodiments, the μOCT system and probe used herein differs from conventional OCT devices by employing a very broad bandwidth light source (e.g. a 800±150 nm laser-generated supercontinuum) and a common path reference arm to achieve 1-μm depth or axial (z) resolution. In order to achieve high transverse (x, y) resolutions, a relatively high numerical-aperture objective lens (numerical aperture=0.12) was used to focus the beam onto the sample. The focus of the probe beam was further engineered with an annular apodizer, which reduced the focal spot size from 2.4 μm down to 2.0 μm. Apodization and chromatic dispersion extended the focal depth to ~300 μm, enabling cross-sectional imaging at these high resolutions. In yet another embodiment, μOCT may be based on swept-source OCT (SS-OCT), alternatively known as optical frequency domain imaging (OFDI). In this alternative embodiment, radiation from a broad bandwidth swept source laser is split with a part impacting a reference and another part impacting the sample. The spectral interference pattern is detected using one or more detectors and Fourier transformed to obtain a depth-resolved reflectivity profile. Scanning the beam across the sample while recording depth-resolved reflectivity profiles creates the SS-OCT image. Extended depth of focus methods similar to that used in SD-OCT (phase or amplitude apodization, sub-diffraction multi focus projection, axicons, etc.) are used to obtain high lateral resolution over a long depth, facilitating depth-resolved or cross-sectional imaging.

FIG. 1 shows an exemplary system which includes a spectral domain (SD) OCT imaging console and a common-path benchtop probe. In the particular embodiment shown in FIG. 1, a supercontinuum light source (SuperK EXTREME, NKT Photonics) was used to illuminate a 50/50 beam splitter. Half of the source light was transmitted from the splitter to the benchtop probe. Light returning from the probe was relayed back to the spectrometer. The spectrometer was composed of a 940 lines/mm volume phase holographic transmission grating (Wasatch Photonics Inc.), a multi-element camera lens, and a line scan camera (Basler Sprint, Basler Inc.). 2,500 camera pixels were used to detect a total spectral range of 800±200 nm with a full width at half maximum 800±150 nm, so that the coherence length was 1 μm and the ranging depth was 1.25 mm in tissue. The detected signals were digitized at 12-bit resolution and transferred to a computer through the camera link cable and image acquisition board (PCIe 6341, National Instruments) at 20,480 lines (spectra) per second. The maximum camera exposure time at this line rate was 48 μs. In the benchtop probe, the light beam was split into two wavefronts by a 45° rod mirror (NT54-092, Edmund Optics Inc.). The central circular wavefront went to the reference arm and the annular wavefront went to the sample arm. The optical power on the sample was approximately 15 mW. The reference arm was equipped with optics identical to those of the sample arm, so that dispersion was balanced. Light back-reflected from the reference arm and backscattered from the sample arm was recombined through the rod mirror and guided by the single mode fiber (SM600, Thorlabs Inc.) back to the console. Transverse (x,y) scanning was performed using a pair of galvanometer scanners (Thorlabs, Inc) driven by an analog output board. A two-dimensional data size was 512×2500 voxels (x, z) and the corresponding reconstructed cross-sectional image size was 1 mm×1.25 mm (x, z). The x-direction galvanometer scanner followed either a saw-tooth scan pattern at 40 Hz or a stepwise scan pattern with increments occurring at 20.48 Hz. Acquisition of a time-series of two-dimensional data at 512 cross-sectional planes spanning across a 1 mm lateral range (y) yields a three-dimensional d-μOCT data set.

Thus, in certain embodiments there is provided an apparatus for obtaining image data and functional data from biological tissue. The apparatus may include an interferometer to acquire interferometric information along an imaging plane that is based on radiations provided from a reference interfered with by the biological tissue. The apparatus may also include a processor configured to receive the interferometric information from the interferometer. The processor may be configured to perform various steps, including processing the interferometric information to generate a morphological or phase image of the biological tissue along the imaging plane, determining frequency information from temporal modulations of the interferometric information induced by dynamic functions of the biological tissue, and generating a report or image that spatially maps the dynamic functions of the biological tissue. This report or image may be combined with the morphological image.

In various embodiments, the processor may be further configured to identify temporal fluctuations in the interferometric information induced by dynamic functions of the biological tissue. In other embodiments, the processor may be further configured to conduct a power frequency analysis of the temporal fluctuations to identify fluctuations arising from intracellular motion of the biological tissue. In still other embodiments, the processor may be further configured to perform the power frequency analysis on a pixel-by-pixel basis. In yet other embodiments, the processor may be further configured to track dynamic functions of the biological tissue across longitudinal studies. In still further embodiments, the longitudinal studies may include drug delivery to the biological tissue. In yet other embodiments, the drug may be a chemotherapeutic drug. In other embodiments, the interferometer may form part of a HOCT system. In still other embodiments, the interferometric information may be resolved to at least 2 µm by 2 µm laterally or 1 µm axially. In yet another embodiment, the interferometric information may be resolved to at least 4 µm by 4 µm laterally or 2 µm axially (depth). In certain embodiments, the biological tissue may be in vivo and in other embodiments, the tissue may be ex vivo, or three-dimensional cell cultures in vitro. In some embodiments, processing the interferometric information to generate a morphological image of the biological tissue along the imaging plane may further include steps to compensate for motion artifacts, including locally normalizing and filtering the intensity or phase values of pixels in the µOCT frames to generate processed frames, computing an unwarping transformation matrix (e.g. elastic unwarping) for each of the processed frames, with or without a reference frame, and applying the transformation matrices to the µOCT frames.

In various embodiments there is provided a method for obtaining image data and functional data from biological tissue. The method may include various steps including: acquiring interferometric information along an imaging plane that is based on radiations provided from a reference interfered with by the biological tissue, processing the interferometric information to generate a morphological image of the biological tissue along the imaging plane; determining frequency information from the temporal modulations of the interferometric information induced by dynamic functions of the biological tissue, and generating a report that spatially maps the dynamic functions of the biological tissue with the morphological image.

PCA Dimension Reduction and Machine Learning

In various embodiments disclosed herein, spectral analysis (e.g., power spectrum, standard deviation, variance, Fourier entropy) of temporal fluctuations found in µOCT videos was used to generate data that allows cross-sectional cellular dynamics in whole tissue to be studied. By appropriate binning of the spectral data to create pseudo-colored composite images, it is demonstrated that the presently-disclosed methods enhance our ability to delineate cellular/subcellular features in the cross-sectional imaging plane and characterize intracellular dynamics within tissues without any need for exogenous labeling. The results also emphasize the capabilities of d-µOCT to interrogate cross-sectional subcellular structure and concomitant variations in cell dynamics and activity from the basal to superficial epithelial layers. The significance of this capability is high, as depth-dependent changes in cellular and architectural maturation patterns are critical for the diagnosis of many epithelial diseases, including dysplasia and cancer.

In certain embodiments, d-µOCT is utilized in freshly excised biopsy samples that are kept alive in culture media. Images from these biopsies were difficult to register with histological images at the subcellular level and thus some of the interpretations of subcellular behavior are preliminary. There is also much to learn about the mechanistic origins of the cellular motions measured by this technique. In the literature, there is evidence that supports the notion that these dynamical fluctuations, while random, are distinctly different from thermal-driven Brownian motion. Instead, they are a consequence of an aggregate of ATP-dependent random forces that orchestrate cell motility, among other biomechanical effects. Additionally, an improved understanding of the relationship between intracellular dynamics and underlying physiological and pathobiological conditions still needs to be obtained. Numerous studies, mainly with in vitro models, have investigated the origins of intracellular dynamics. In some of these studies, dynamic signals have been associated with contractile protein filaments in organelle transport and cell motility, which have shown to be modulated by pharmaceutical agents. These results indicate that the physiological origins of the dynamical behavior being probed can be used to inform of pathologies and their response to treatment. Owing to its high resolution in all three dimensions, d-µOCT is well suited to perform these investigations. Yet, larger studies of various tissue/cell types in different states with identification/modulation of specific intracellular molecular motion-dependent mechanisms are warranted to fully understand the wealth of information that d-µOCT provides.

While intact tissue is an excellent substrate for d-µOCT, embodiments of the disclosed procedures could also be of great use for additional assays including two- and three-dimensional cell culture, spheroids, organoids, and organs-on-chips, among others. The advantage of d-µOCT as a cell viability assay would be the ability to determine the metabolic or pathobiologic state of cells in these platforms without destroying the sample for viability staining or cell-type characterization. Such an application of d-µOCT could improve the efficiency of many multicellular assays being developed today.

Another application of d-µOCT is its performance in vivo. µOCT has now been demonstrated in living human patients in the nasal cavity, showing a unique capacity to interrogate ciliary and mucus dynamics. d-µOCT will be more difficult to implement in vivo because of the need for patient stabilization at the subcellular level during an extended imaging period (seconds). Technologies such as tight coupling of the tissue with a µOCT probe could overcome this problem, opening up a new label-free option for high cellular contrast and functionally informed optical biopsy.

Following is a description of materials and procedures for carrying out various embodiments along with description of exemplary results.

Tissue Preparation and Imaging

In certain embodiments, human upper gastrointestinal biopsies and cervical biopsies were obtained from study participants. Each of the biopsies was immersed in cell culture medium immediately after excision to preserve tissue viability. In preparation for d-μOCT imaging, the biopsies were placed on a glass slide and, by means of a dual-axis goniometer, the luminal side of the tissue was tilted with respect to the imaging beam to avoid specular reflection. All imaging was performed at room temperature (25° C.) and samples were kept moist over the course of an imaging session by the addition of small amounts of cell culture medium on the tissue as necessary. Despite efforts to keep the sample well-moistened, image artifacts arising from moisture evaporation were occasionally noticeable in the real-time display of the images, especially for small biopsy samples. Therefore, certain samples were performed with the luminal side of the tissue placed in contact with a glass slide to minimize moisture loss during imaging. After d-μOCT imaging, the imaged region was marked with a dye before being fixed in formalin. The samples were then processed to obtain 5 μm thick hematoxylin and eosin (H&E) stained histology slides corresponding to the region imaged by d-μOCT.

Embodiments providing high spatial and temporal resolution dynamic μOCT imaging

In various embodiments herein are provided systems and methods that probe subcellular dynamics in a cross-sectional plane. Such a cross-sectional imaging system may have resolutions less than 2 μm axial resolution and less than 5 μm lateral resolution. The methods may involve acquiring multiple images, regions, lines, or points over time. A power spectral density measurement may be made for each pixel in the image. Exemplary embodiments include time frequency analysis (e.g. short-time Fourier transform, Wigner transform, Wavelet transform, etc.) or power spectrum estimation techniques (e.g. Welch's method) at every pixel of the image, or other methods for computing frequency information over time locally. An alternative embodiment is to determine the entropy of the frequency spectrum or other methods for quantifying the frequency content of signals.

Two beam scanning embodiments are disclosed. One scheme enables the probing of frequency content up to half of the galvanometer mirror scan rate, in one embodiment the rate ranges from about 1-40 Hz. In another embodiment, the mirror stops at a single spot, acquires data at the Aline rate, in one case approximately 1-20 kHz, but alternatively could be approximately 1 kHz-3 MHz.

Microscopy, Data Acquisition, and Data Processing

A benchtop μOCT system microscope was used to provide cross-sectional images of intact tissues with a resolution of 2×2 μm (lateral)×1 μm (axial) to a depth of 300 μm. Imaging was performed using an A-line (depth-dependent reflectivity profile) rate of 20.48 kHz, and a 1 mm lateral scan was achieved by scanning the beam across the sample using a galvanometer mirror. A custom-written data acquisition program capable of real-time display of image contrast based on a pixel-by-pixel standard deviation approximation was used to facilitate the identification of viable portions of the tissue samples. Two different imaging schemes that probed the dynamics of distinct frequency ranges were utilized to yield d-μOCT images. The first method, termed multi-scan (MS) d-μOCT, included repeatedly scanning the imaging beam laterally across region of interest at a frequency set by the galvanometer scan rate over a time period. To probe frequencies up to 20 Hz, the imaging beam was scanned repeatedly across a 1 mm region of interest at 40 Hz (to avoid aliasing effects), typically over a duration of 25 s. This yielded 1000 cross-sectional images of the same location, each composed of 512 A-lines. In the second imaging scheme, termed single-scan (SS) d-μOCT, the imaging beam traversed across a lateral range of interest in a stepwise fashion, stopping at equally-spaced positions each time to acquire a series of A-lines at a rate determined by the A-line rate. To match the imaged region of interest as the first scheme, 25 s (i.e. same amount of time as the previous scanning scheme) is required to acquire 1000 A-lines at 20.48 KHz at 512 discrete positions across the 1 mm range. SS d-μOCT enables the probing of cellular dynamics greater than two orders higher than the first, albeit at a lower frequency resolution. A higher frequency resolution can be achieved with acquisitions of longer periods of temporal data. To probe frequencies up to 10.24 kHz, the imaging beam traversed across the same 1 mm lateral range in a stepwise fashion, stopping at 512 equally-spaced positions where 1000 A-lines were acquired at a rate of 20.48 KHz. Both scanning protocols took the same amount of time (25 s) to complete. In various embodiments, frequencies are probed in a range of 0 Hz to 50 Hz based on time points collected at each location or subregion (e.g. pixels and/or voxels) within the sample of up to 100 Hz, where the frequencies are generally probed at half the frequency of the collected data to avoid aliasing effects.

In both imaging schemes, the fluctuation of the μOCT signal intensity as a function of time is analyzed at every pixel of a cross-sectional image. In yet another embodiment, neighboring pixels can be evaluated and averaged to reduce noise. With an assumption that the fluctuations are ergodic processes, by employing short-time Fourier transform (STFT) with Welch's method, an estimated power spectrum for each pixel in the HOCT dataset was obtained. In this approach, time dependent data was analyzed in shorter segments instead of in its entirety.

Even though the d-μOCT imaging time was reasonably short (25 s), images of tissue that underwent the first beam scanning scheme suffered nonlinear and spatially dependent motion drift on the order of tens of micrometers. Tissue motion was likely due to evaporation and/or thermal expansion, causing tissue settling during imaging. To compensate for these motion artifacts, μOCT frames were locally normalized and Gaussian filtered. An elastic unwarping transformation matrix was computed from these processed frames using the center frame (500) as the reference. These transformation matrices were then applied to the original μOCT data. Subsequently, with the assumption that the fluctuations are ergodic processes, an estimated power spectrum for each pixel in the μOCT dataset was obtained by employing a short-time Fourier transform with Welch's method. With this approach, time-dependent data was analyzed in shorter segments instead of in its entirety. Multiple segments, each a fifth in length (L=200) as compared to the full temporal data and each overlapped by 50% with the next, were processed to derive multiple modified periodograms, $I_k$. For a given length of recorded data, the length of each segment and the amount of overlap determined the resultant spectral resolution and variance of the estimated power spectral density, $\hat{P}$. Processing steps were employed which involved first applying a Hanning window, w, to each mean-subtracted segment before zero-padding it to achieve an array of 512 elements, $S_{x,y}$. A discrete Fourier transform (DFT) was then applied to each segment and the results were averaged to yield the power spectrum at that pixel. A hyperspectral data set with M=256 equally-spaced frequency bins ($f_{x,y}$) was obtained by performing this process for every pixel in the cross-sectional plane.

$$I_k(f_{x,y}) = \frac{M^2}{LU}|DFT\{S_{x,y}\}|^2 \quad (1)$$

$$U = \frac{1}{L}\sum_{j=0}^{L-1} w^2(j) \quad (2)$$

Based on these data acquisition parameters, the estimated power spectrum was computed from nine averages, thus effectively reducing the variance in the estimated power spectrum by that equivalent factor.

$$P(f_{x,y}) = \frac{1}{K}\sum_{k=1}^{K} I_k(f_{x,y}) \quad (3)$$

In both imaging schemes, similar processing methods were applied to the resultant time-dependent data to obtain 256 equally-spaced frequency bins that ranged from either 0-20 Hz or 0-10.24 kHz. The latter imaging scheme enabled the probing of cellular dynamics two orders of magnitude higher than the former, albeit at a lower frequency resolution.

To enable direct visualization of the distribution of the dominant fluctuation frequencies within the tissue, P was further binned into three frequency ranges and was each assigned a color channel within an RGB image (e.g. red: 0-0.08 Hz, blue: 0.55-0.78 Hz, green: 4.00-20.00 Hz) to create a final d-μOCT image representation. In certain embodiments, the frequency range color assignment was selected empirically to accentuate subcellular and cellular features of the tissue and, thus varied between samples. All μOCT and d-μOCT images presented here were scaled to achieve an isotropic pixel aspect ratio, assuming a tissue refractive index of 1.4, to ensure accurate representation and to facilitate comparison with corresponding histological images. All image reformatting and analysis were conducted using ImageJ and Matlab (Mathworks Inc).

In various embodiments, the fluctuation frequency information can be binned or divided into any number of subgroups (e.g. from 2 subgroups up to 10 or more subgroups) and each of the subgroups may be displayed differently on a map of the tissue (e.g. as shown in FIG. 2(B)). The number of distinct frequency ranges that enable the delineation of different biological structures is a key consideration in choosing the number of frequency bins used to depict a d-μOCT image. Frequency bins can also be based on local maxima of the power spectrum or patterns in the power spectrum. Frequencies can also be analyzed spatiotemporally—for example, one frequency pattern or peak in the nucleus may have a different biological meaning than the same frequency pattern adjacent to the nucleus, far from the nucleus, or present on a cell or organelle membrane.

The identities and maximum number of subgroups of frequency ranges or peaks and the most meaningful frequency ranges or peaks can be determined using dimension reduction techniques such as principal component analysis (PCA), kernel PCA, linear or generalized discriminant analysis, UMAP, t-SNE, or the like. Principal component images, corresponding to the principal components that describe most (e.g. 80% or 90%) of the variance in the power spectrum for example, can correspond to different frequency patterns that indicate different regimes of motion in the image. As with the frequency bins described above for the R, G, B channels of a color image, PCA principal component weight images can also be used to create a multicolor image. Similar approaches may be used for other dimension reduction methods to create multidimensional images.

Image Registration

As spectral analysis for d-μOCT processing is done on a pixel-by-pixel basis, bulk motion or motion not related to intracellular and membrane fluctuation motion that occurred during image acquisition should be corrected. An image registration algorithm was applied to correct for in-plane bulk motion artifacts as necessary. Two-dimensional cross-correlation was performed between or among successive image frames to measure the amount of lateral shifts required to register the images. After conducting bulk motion correction, localized unwarping with affine transformation can refine the motion correction further.

Attenuation Correction

Depth-dependent attenuation of μOCT intensity occurs along the optical axis, causing information below the surface to gradually drop to noise level. An algorithm was developed to perform attenuation correction and amplify μOCT signals along depth during image post-processing. Algorithms for such depth dependent correction include exponential fitting, reslicing→image normalization or equalization→reslicing, or time-gain or depth-gain adaptive compensation.

Image registration and attenuation correction were employed as necessary before the power spectrum at each pixel of the cross-sectional image was calculated.

Spectral information is binned into multiple frequency ranges and the result is color-coded to create a pseudo-color composite. This facilitates visualization of cellular structures that were not discernible in static μOCT images.

Image registration is another embodiment added to the method to improve quality of results that corrects for motion of the specimen during the acquisition sequence.

Attenuation-correction of the μOCT signal along the optical axis is a further embodiment that improves the quality of the results by correcting for intensity fluctuations that are due to overlying optical properties.

During data acquisition, real-time running standard deviation estimation was used to identify viable regions that exhibit variation in cell dynamics in samples.

Report Generation

After a morphological image and/or a frequency map based on a morphological image is generated, a report may be generated and transmitted based on one or more of the image, the map, a diagnosis based on the image or map, or a characteristic that is determined based on the image, map, or diagnosis. The report may include image data such as the morphological image or frequency map and also may include information regarding the diagnosis or characteristic that is determined based on the image, map, or diagnosis. The report may be transmitted in various forms including electronically and/or in a hard (e.g. paper) copy. The report may be transmitted to a clinician (e.g. a physician, nurse, technician, or other medical professional), a researcher, a patient, or an entity such as a healthcare provider.

Figure 2:
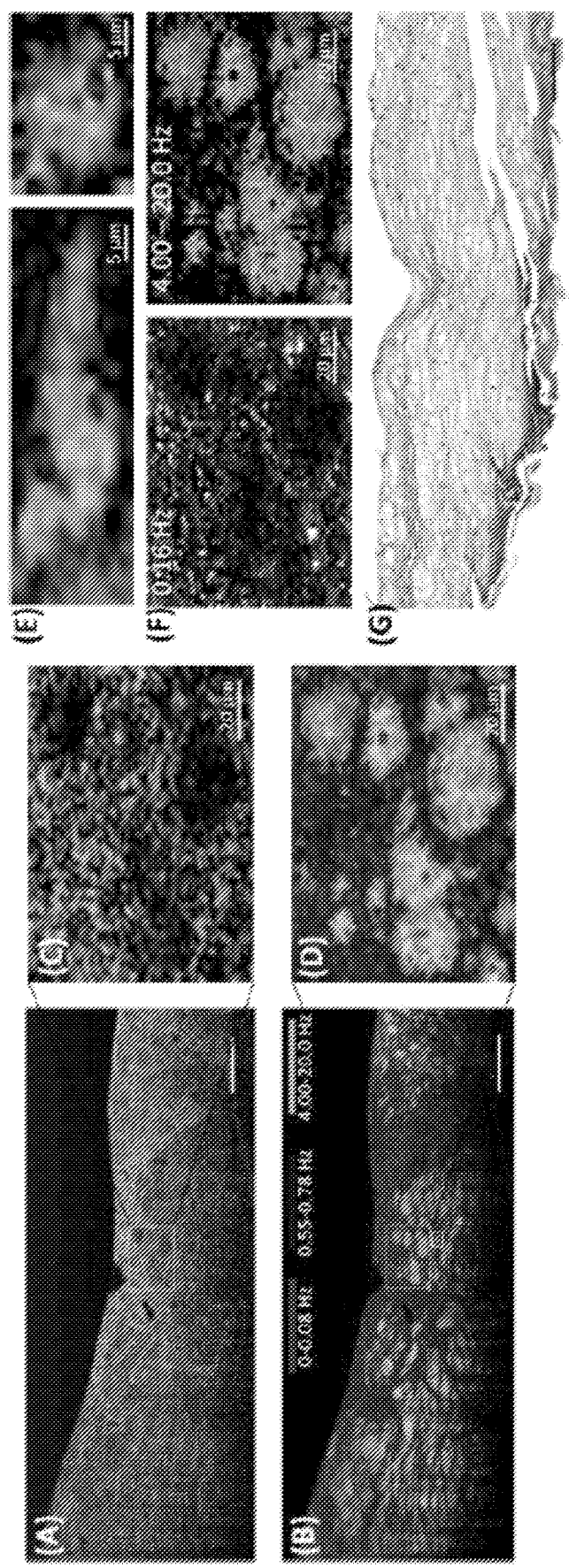
FIG. 2 shows images of a human esophageal biopsy. Panel (A) shows a 200-frame averaged, standard μOCT image of the biopsy. Panel (B) shows the pseudo-colored d-HOCT image shows numerous different cells exhibiting various intracellular motion-associated frequency content. Panels (C) and (D) show magnified portions of the white ROIs shown in panels (A) and (B), respectively, from the same location in the sample. Panel (E) shows magnified views of the yellow ROIs in the d-μOCT image of panel (B) showing cell cytoplasm (green), the nucleus (red), and a perinuclear region (blue), all exhibiting different frequency ranges. Panel (F) shows d-μOCT images from the white ROI in panel (A) corresponding to different frequency ranges. Panel (G) shows corresponding histology image (H&E) of the biopsy sample. d-μOCT color codes: Red 0-0.08 Hz, Blue 0.55-0.78 Hz, Green 4.00-20.0 Hz. Bars=100 μm unless indicated otherwise.
Figure 3:
FIG. 3 shows intracellular dynamics probed over a wide frequency range. Panels (A)-(C) show frequency maps of the human esophageal biopsy shown in FIG. 2 at panels (A) 10, (B) 803, and (C) 2972 Hz. Bars=100 μm.

Functional imaging with d-μOCT was performed on biopsies obtained from subjects who were diagnosed with various esophageal disorders. FIG. 2 shows images of an esophagus biopsy taken from a subject undergoing endoscopy for chronic gastroesophageal reflux disease (GERD). In the averaged (n=200) standard OCT image depicted in FIG. 2A, some structures were discernible but not highly prominent due to insufficient refractive index contrast. Detailed visualization of cellular features was further hampered by the presence of speckle, which is a common source of noise in OCT images even after frame averaging. With d-µOCT (FIG. 2B), much greater cellular contrast was achieved. This increase in contrast was due to differences in sub-cellular motion in separate tissue compartments, with motion of the optical scatters in the cytoplasm associated with higher frequencies than those of cell membranes and interstitial spaces. Organelles such as cell nuclei also became distinguishable using d-µOCT owing to their lower frequency content (FIG. 2D, 2E). In some cells, fluctuations over a moderate frequency range (FIG. 2E, blue; 0.55-0.78 Hz) was seen surrounding the nucleus (FIG. 2E, red), possibly representing motion in the vicinity of perinuclear organelles. The use of power spectrum analysis and selection of suitable frequency ranges from the resultant hyperspectral data provided a means for selective visualization of different tissue structures. For instance, as illustrated in FIG. 2F, cell membranes appeared brighter than the cytoplasm at 0.16 Hz, while the contrast was reversed at a higher frequency range of 4-20 Hz. In addition to providing detailed micro-structural information similar to the corresponding H&E-stained histology (FIG. 2G), d-µOCT also informed on different intracellular motion rates on a single cell basis. For example, some of the suprabasal squamous cells exhibited higher frequency content than others (FIGS. 3A-3C), indicating intracellular motion heterogeneity within the same cell types.

Figure 4:
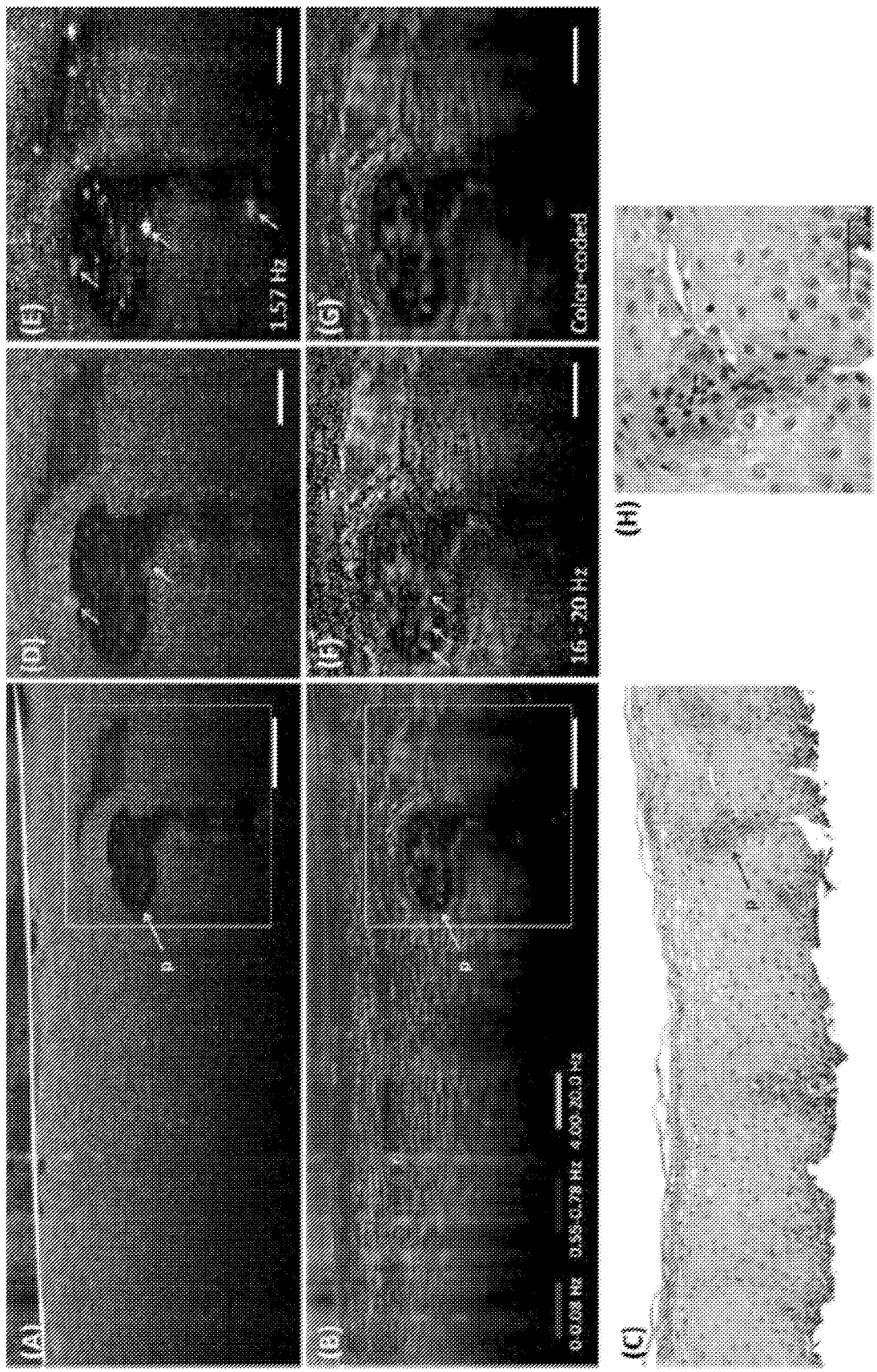
FIG. 4 shows images from a human esophageal biopsy. Panel (A) shows a 200-frame averaged μOCT image of the biopsy. Panel (B) shows d-μOCT color-coded image. Panel (C) shows corresponding H&E stained histology of the sample. Panels (D) to (H) shows enlarged views of the papilla outlined in panels (A) and (B). Panel (D) is a standard μOCT image of the papilla. Panels (E) and (F) are d-μOCT images of the papilla at 1.57 Hz and 16-20 Hz, respectively. Panel (G) is a d-μOCT pseudo-colored composite image of the papilla. Panel (H) is a histology image of the papilla. p: papilla. d-μOCT color codes: Red 0-0.08 Hz, Blue 0.55-0.78 Hz, Green 4.00-20.0 Hz. Bars in panels (A) to (C)=100 μm. Bars in panels (D) to (H)=50 μm.

FIG. 4 shows images of an esophageal biopsy. A papilla extending from the base of the biopsy (FIG. 4A, p) can be seen in the standard µOCT image, but it otherwise was homogenous and did not reveal any clearly discernable cellular features throughout. In contrast, many additional morphological and functional details were seen in the pseudo-colored d-µOCT image (FIG. 4B) that were not apparent in the standard µOCT image. With d-µOCT, individual squamous cells (FIG. 4B) were readily identified, which were closely matched in appearance to those in the corresponding histology (FIG. 4C). Moreover, the depth-dependent maturation was revealed in the stratification of the intracellular dynamics, where the most superficial and mature cells exhibited slow motion whereas the immature cells deeper in the biopsy showed more rapid intracellular motion. These findings are consistent with our understanding of squamous epithelial maturation, where cells divide and mature in a depth-dependent manner, from the basal layer to the surface, eventually dying and desquamating at the top. Another prominent feature that was enhanced by d-µOCT was the squamous papilla. In the standard µOCT image (FIG. 4D), cells at the periphery of the large papilla were sometimes faintly observed, with a brightness that was similar to that of the surrounding squamous cells. With d-µOCT, these cells were highlighted in low frequency spectral images such as in the 1.57 Hz image shown in FIG. 4E. There were other cell types apparently within the papilla that displayed activity in the higher frequency range of 16-20 Hz (FIG. 4F). The corresponding histology (FIG. 4H) suggests that some of these cells may be intrapapillary leukocytes and other basal epithelial cells.

Figure 5:
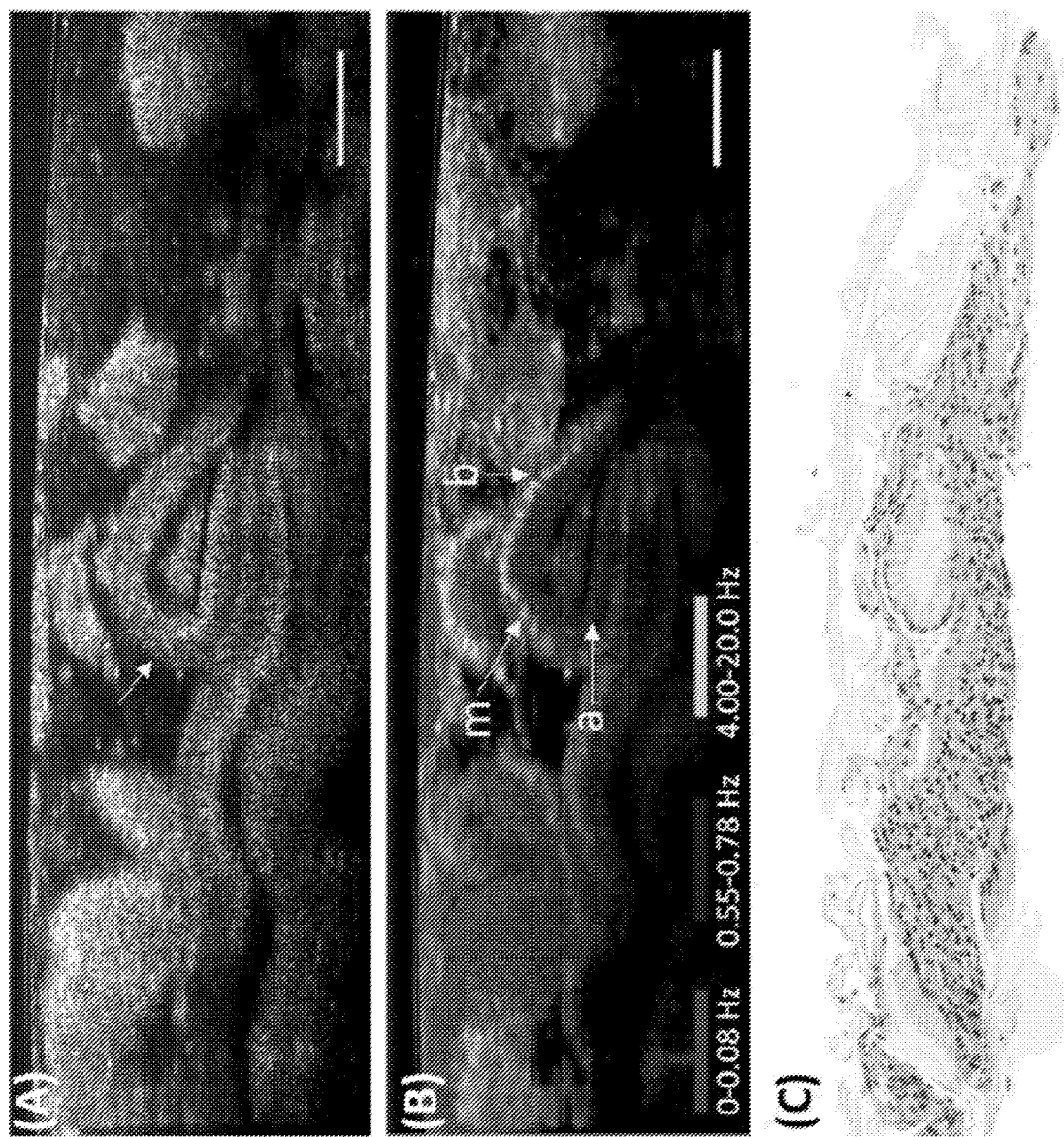
FIG. 5 shows images of a biopsy from a human gastroesophageal junction. Panel (A) shows a 200-frame averaged μOCT image of the biopsy showing columnar glandular architecture (arrow). Panel (B) shows color-coded d-μOCT image demonstrating glands containing cells with low frequency regions at their base (b), high-frequency modulation in the middle (m), and low frequency apically (a). Panel (C) shows a comparison with the histology of the biopsy showing mucous cells. d-μOCT color codes: Red 0-0.08 Hz, Blue 0.55-0.78 Hz, Green 4.00-20.0 Hz. Bars=100 μm.
Figure 6:
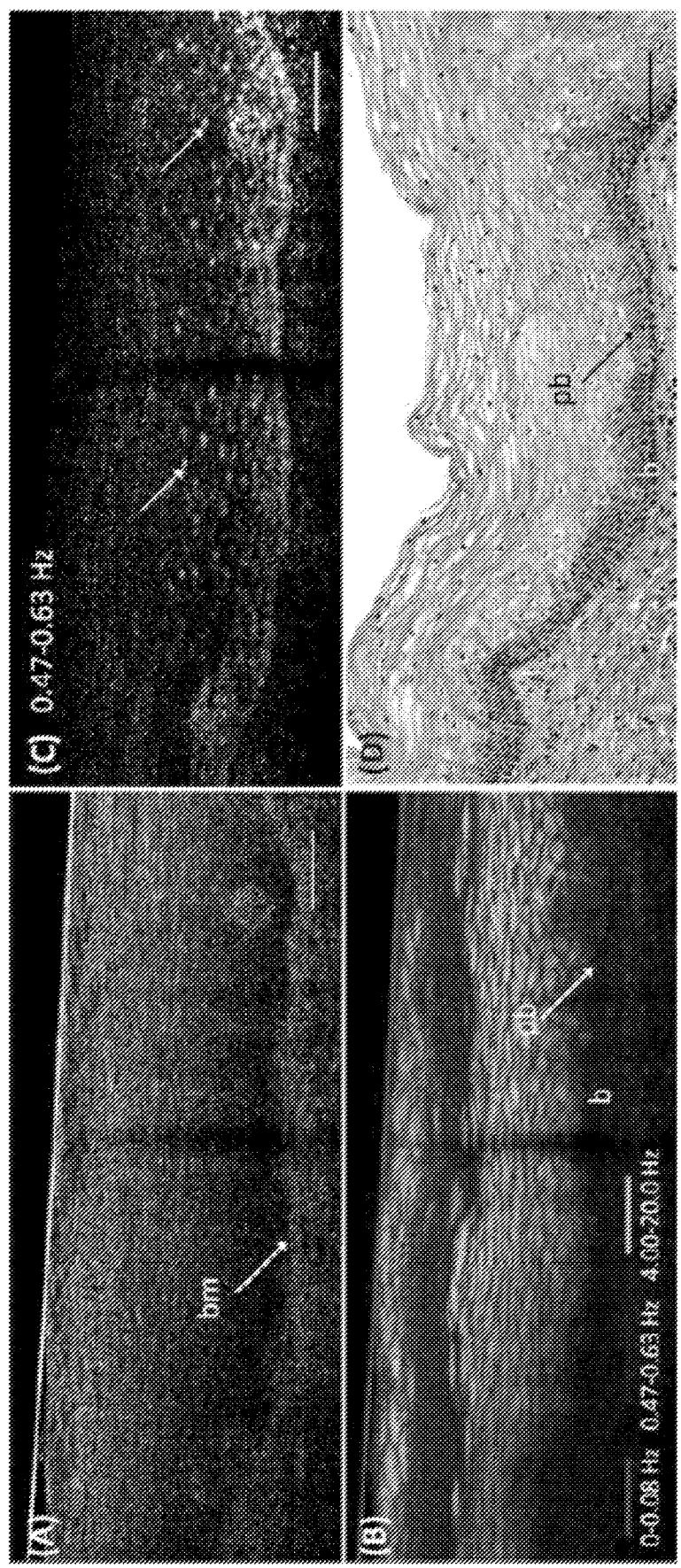
FIG. 6 shows images of a human cervical biopsy. Panel (A) shows a 200-frame averaged μOCT image of the cervical biopsy. The basement membrane is indicated as bm. Panel (B) shows the corresponding d-μOCT image. The basal (b) and parabasal (pb) layers can be clearly delineated from the intermediate and superficial layers. Panel (C) shows d-μOCT image that corresponds to the frequency range of 0.47-0.63 Hz (blue channel in panel (B)) showing punctate regions in a cellular distribution (arrows). Panel (D) shows corresponding H&E histology. d-μOCT color codes: Red 0-0.08 Hz, Blue 0.47-0.63 Hz, Green 4.00-20.0 Hz. Bars=100 μm.

The ability of d-µOCT to accentuate cellular structures that were otherwise not visible with µOCT is further illustrated in an example of a biopsy taken from the gastroesophageal junction of a human subject (FIG. 5). The standard µOCT image (FIG. 5A) shows glandular architecture with difficult to discern intracellular contrast. With d-µOCT, low frequency basal structures consistent with nuclei (FIG. 5B, b) and apical mucinous cytoplasm (FIG. 5B, a) came to prominence. Interestingly, the middle of the cells showed an abundance of high frequency content (FIG. 5B, m). The corresponding histology (FIG. 5C) confirmed that these glands contained mucinous cells.

d-µOCT provided additional findings when imaging cervical squamous epithelium (FIG. 6). The basement membrane (FIG. 6A, bm) and the outlines of a few squamous cells were observed in the frame-averaged standard µOCT image of the cervical squamous epithelium (FIG. 6A). The corresponding d-µOCT image showed detailed features of most of the cells within the squamous epithelium across the entire cross-sectional image (FIG. 6B). The basal and parabasal cells (FIG. 6B, b, pb) within the lower quarter of the epithelium had a significant amount of 0.47-0.63 Hz frequency content (blue in FIGS. 6B, 6C) that was present throughout the cytoplasm. The intermediate cells demonstrated this moderate-level frequency content primarily only in the center of the cells (FIG. 6C, arrows). As the cells matured towards the surface, they became progressively flatter with less 0.47-0.63 Hz signal (FIG. 6C). Low frequency content (0-0.08 Hz) was predominant near the surface (FIG. 6B, red). These observations match well with the corresponding histology shown in FIG. 6D and highlight epithelial maturation features characterized by intracellular dynamics that differ in a depth-dependent manner.

EXAMPLES

Following are non-limiting examples of procedures that may be performed using one or more of the disclosed apparatus, methods, or systems:
Imaging and Identification of Cells d-µOCT imaging of freshly excised human tissues may be conducted and registered to histologic slides on a per-cell basis. Available d-µOCT machine learning algorithms may be trained/validated to detect distinct human cell and tissue types, using corresponding H&E and immunohistochemistry (IHC) as ground truth.

The capability of d-µOCT to differentiate live/apoptotic/dead cells in 3D cultures may be accomplished by treating spheroids from multiple different human and murine melanoma cell lines. d-µOCT may be conducted on control and treated spheroids and results compared to gold standard, fluorescence-based analysis of cell death with Hoechst-33342, annexin V-FITC, and propidium iodide (PI) staining. In such cases, we have found that live spheroid tumor cells exhibit medium frequency motion content, apoptotic cells exhibit high frequency motion content, and dead cells exhibit low or zero frequency motion signatures.

Dynamic µOCT imaging may be performed on freshly excised, implantable microdevice-treated human tumor mouse models and compared to a panel of established IHC markers associated with drug efficacy. The data will define drug- and tumor-dependent d-µOCT signatures associated with apoptosis and cell death in cancerous tissues.

Human tumor mouse model tissue may be modified by well-characterized pharmacological inhibitors of molecular processes related to cell proliferation (cytoskeletal, metabolic, growth). The change in the cell/tissue frequency content as a function of drug mode of action informs on the mechanisms that underlie the d-µOCT signal.

Image Quality Improvements and Characterization of Intracellular Motion

Imaging system modifications, including the use of a broader bandwidth light sources, larger numerical aperture (NA), and extended depth of focusing optics may increase spatial resolution two-fold along all dimensions. Subpixel super-resolution and temporal extrapolation algorithms may be used to further increase spatial and frequency resolutions.

Time-frequency analysis and machine learning algorithms may be used to mine the d-µOCT data more extensively to discover additional biomedically-relevant information in the motility signal.

Stabilization, out-of-plane 3D scanning, and high-speed, phase-sensitive d-µOCT methods may be developed to reduce motion artifacts encountered when imaging living systems. Two probes (handheld and endoscopic) may be created for d-µOCT imaging in patients; feasibility of using these devices in vivo may be tested in skin and upper gastrointestinal tract clinical pilot studies.

Figure 7:
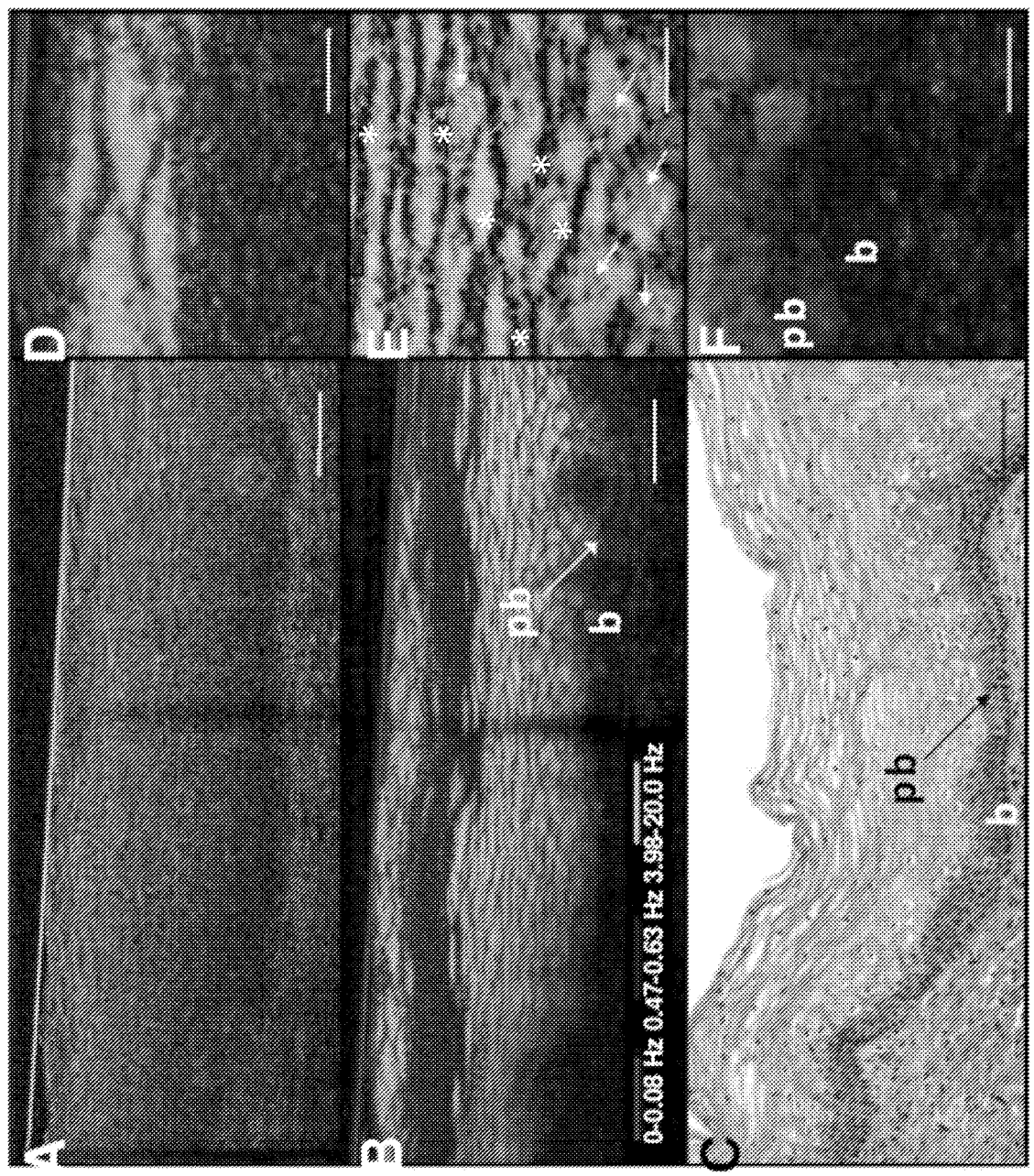
FIG. 7 shows cross-sectional images of a human cervical biopsy. Panel (A) shows static μOCT image of the cervical biopsy. Panel (B) shows corresponding d-μOCT image. The basal (b) and parabasal layers (pb) can be clearly delineated from the intermediate and superficial layers. Panel (C) shows corresponding H&E histology. Panels (D)-(F) show magnified portions of the d-μOCT image in panel (B) showing detail of the superficial cells in panel (D), intermediate cells in panel (E), and basal/parabasal cells in panel (F). Orange arrows (with adjacent asterisks '*') in panel (E) denote nuclei (red) and white arrows, paranuclear mid-frequency content (blue). d-μOCT color codes: Red 0-0.08 Hz, Blue 0.47-0.63 Hz, Green 3.98-20 Hz. Bars in A-C, 100 μm; D-F, 25 μm.

In various embodiments, dynamic µOCT was used to measure intracellular motion within cells in cross-sectional images of freshly excised human tissues. With dynamic HOCT (d-µOCT), the pixel-by-pixel temporal power spectrum of successively acquired µOCT images was computed and different frequency bands were encoded in distinct RGB color channels (FIG. 7B). Results show a remarkable increase in image contrast; different cellular and subcellular features emerge at distinct characteristic frequencies (FIG. 7B) that are not seen in the conventional µOCT intensity image (FIG. 7A). As seen in images of the human cervix (FIG. 7), detailed cellular morphology is distinguishable with d-µOCT (FIG. 7B), accentuated by relatively static cell membranes surrounding fluctuating cytoplasm, containing static nuclei (FIG. 7E, orange arrows with asterisks '*'). Owing to the cross-sectional and functional nature of d-µOCT, the maturation pattern can be clearly appreciated, with basal/parabasal cells showing medium frequency content (FIG. 7F, blue), potentially arising from microtubule polymerization or organelle transport, that diminishes and consolidates around the nucleus (FIG. 7E, white arrows) as the cells transition to the intermediate layers. This mid-frequency modulation is absent in the superficial layers (FIG. 7D). Since d-µOCT images are acquired rapidly with a depth priority, a much larger range of frequencies can be probed (FIG. 9) compared to modalities that image in the transverse plane. These rapid, subcellular resolution, cross-sectional imaging capabilities of d-µOCT make it ideal for studying the wealth of dynamic microstructural information that is contained within cells in tissue.

Embodiments of the disclosed procedures may be used to establish a label-free, depth-resolved, microscopic imaging method for phenotyping cells in tissues based on intracellular motility. This has been accomplished by growing an understanding of the biological and clinical relevance of d-µOCT and by developing and validating advanced new d-µOCT technology that dramatically increase its capabilities. The potential impact of d-µOCT on a variety of biomedical fields is described below.

Biomedical imaging. µOCT is a rapidly growing technology that is well positioned to redefine the field of in vivo microscopy due to its capacity to obtain 1-µm-resolution, cross-sectional images of tissue and its relatively straightforward implementation in living patients. µOCT has now been implemented using small diameter probes in vivo, different technology implementations are emerging, and a variety of organ systems/diseases are under investigation. Tissue dynamics phenotyping is also expanding, in conjunction with an increasing need for label-free cell assessment for drug development and individualized therapeutic assays. By merging µOCT with intracellular motility phenotyping, d-µOCT will accelerate both fields, while delivering a powerful new biomedical imaging capability with significant impact.

In vivo microscopy. d-µOCT is well situated to overcome many of the limitations of tissue excision and histopathology. It has cellular resolution, enhanced contrast, and cross-sectional imaging that are close to that of the H&E gold standard (FIG. 7), Moreover, d-µOCT contains functional information that cannot be obtained from static tissue on microscope slides. We have used a small-diameter µOCT probe in humans in vivo, and with the technological advances disclosed herein, will conduct d-µOCT in living patients. d-µOCT's capability to assess cross-sectional, cellular microstructure/function in vivo will allow diagnoses to be made less invasively with reduced sampling error, enabling intervention to be more precisely guided in real time.

3D cell models. New technologies that grow a patient's cells into 3D cell models (organoids, spheroids, organ on a chip, etc.) are playing an increasing role in preclinical drug screening, as they better recapitulate the cellular heterogeneity and function of the original tissue than 2D culture. Commercial assays commonly require the cells to be killed, stained for viability, and counted. As with other high-resolution optical metabolic imaging technologies, d-µOCT may be used to quantify viability, cell type, and cell state longitudinally, without killing the cells. d-µOCT also has a large field of view and 1-µm depth resolution, features that may enable accurate and efficient 3D cellular imaging in organotypic culture platforms.

Individualized therapy. Many different classes of drugs with vastly different mechanisms of action are available to treat patients or are under development. Yet, existing approaches do not provide a good method to measure a drug's efficacy in the living tissue in terms of its specific mechanism of action (e.g. cell viability, the activation of immune cells, a change in metabolic rate, or cell division and proliferation). Some clinical trials perform repeat biopsies to obtain such information but are restricted to single time points with a static readout. d-µOCT, conducted in vivo, may be used for optimizing individualized therapy, to enable diseased tissue to be monitored continuously, providing an earlier and more direct means for determining whether the compound is having the desired effect.

Implantable microdevices (IMD). The IMD is a new technology for monitoring the effects of multiple therapies simultaneously in patients. The device includes separate wells, each containing a different drug/cocktail. After implantation and incubation in a patient's tumor, the devices and adjacent tissue are surgically removed and interrogated with IHC histopathology to quantify necrosis. IMDs may instead be regularly interrogated by d-µOCT in vivo, affording critical cross-sectional imaging information with a functional microscopic readout. As with systemic therapies, real-time continuous monitoring of drug effects significantly increases the impact of this technology versus currently available single time point methods.

µOCT is enabled by the combination of a broad bandwidth supercontinuum source, common path interferometry, and unique extended depth of focus imaging. d-µOCT is a novel extension of conventional µOCT, which imparts unprecedented cellular, cross-sectional, label-free images with more meaningful contrast.

Biological significance of the dynamic signal: A key innovation in this disclosure is the creation of a d-μOCT human cell and tissue atlas, matched to histology (IHC) that spans a variety of cells, tissue types, and pathologies. Analysis of this dataset may determine d-μOCT's diagnostic accuracy for many important diseases. Studies done in spheroids and human mouse tumor models may inform on d-μOCT's capability to quantitate response to therapy and characterize different mechanisms that contribute to intracellular motility. Taken together, this set of experiments may significantly advance the boundaries of knowledge in the field of intracellular motility imaging.

Figure 8:
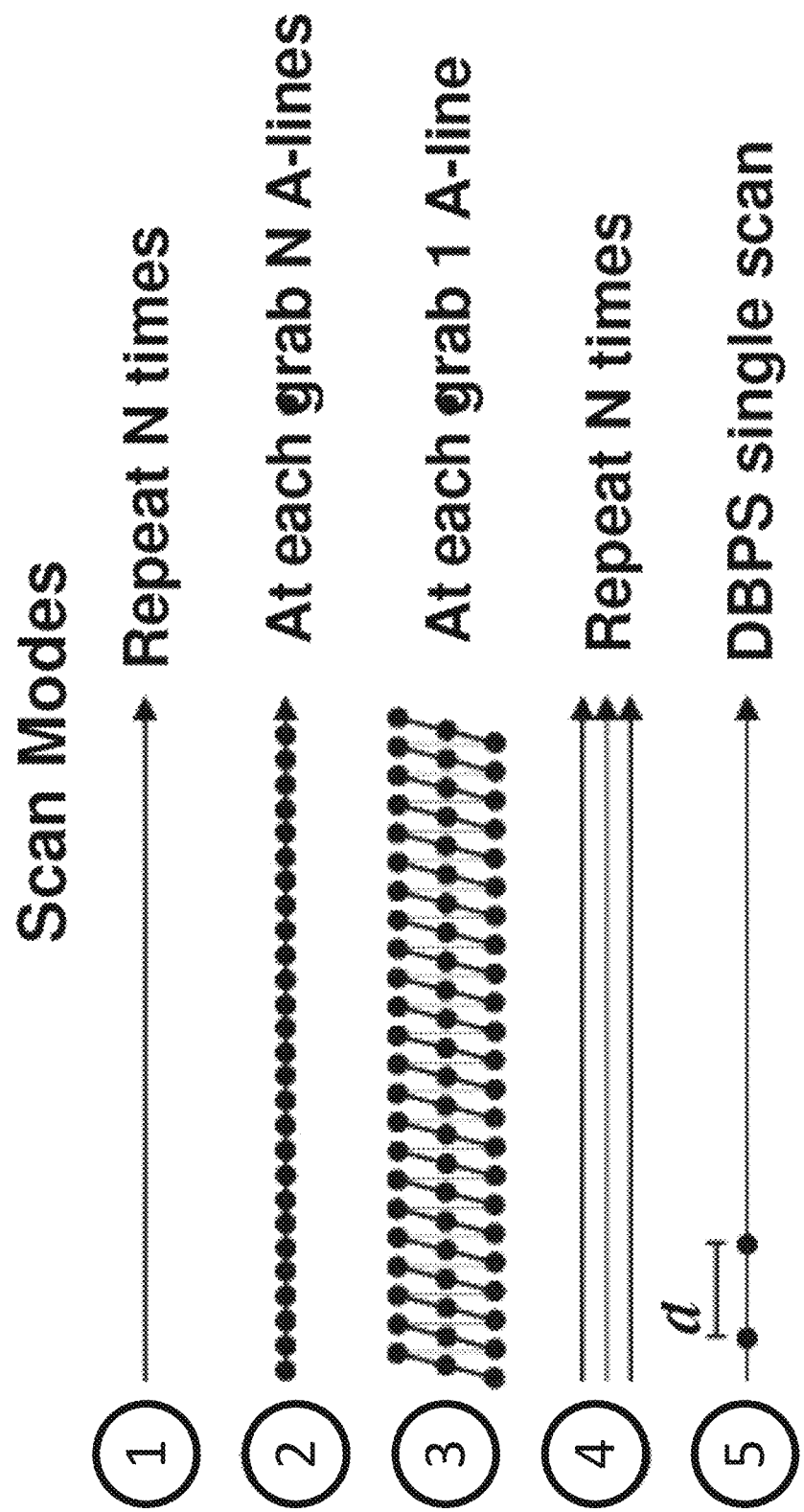
FIG. 8 shows various d-μOCT scan modes 1-5: mode (1): N d-μOCT images are sequentially acquired; mode (2): At each scan point, N A-lines are collected and then the beam is moved to the next scan point until the entire cross-section is imaged; mode (3): The beam is raster dithered, allowing multiple images to be acquired at different imaging planes; mode (4): Multiple beams are scanned (in series or in parallel) to obtain images at different imaging planes; and mode (5): Two beams, offset by distance, d, are simultaneously scanned.

Extending d-μOCT's capabilities: New techniques for increasing spatial and temporal resolution have been developed and validated, extracting maximal information from the intracellular motility signal, and imaging in vivo. These cutting-edge technologies will make d-μOCT far more capable and broadly applicable than it is today. These innovative developments are described in detail below.

d-μOCT enables high contrast, subcellular, cross-sectional motility imaging of intact human and animal tissues ex vivo. d-μOCT data (FIGS. 7, 9-16) were obtained using a μOCT benchtop system microscope that employs a supercontinuum-illuminated, common path, spectral domain OCT (SDOCT) system to obtain cross-sectional images with a resolution of 2 μm×2 μm (lateral)×1 μm (axial). The depth of focus was 300 μm, extended by annular apodization of the sample arm's objective lens. Images were acquired at an A-line (depth resolved reflectivity profile) rate of 20 KHz and spanned 1 mm laterally. All tissues samples were imaged fresh in culture media (10% FBS/DMEM+1% penstrep) at 25° C. Two scan modes were used: 1) N=1000 images (512 A-lines/image) acquired sequentially over a period of 25 seconds (FIG. 8, scan mode 1) or 2) N=1000 A-lines acquired sequentially at each lateral scan point (FIG. 8, scan mode 2). Following local elastic unwarping to remove bulk motion caused by evaporation or vibration, a power spectrum estimate (periodogram) was computed on a pixel-per-pixel basis using Welch's method and frequency normalization. For scan mode 1, to represent the data in a single image, low (~0-0.1 Hz), middle (~0.5-0.7 Hz) and high (~4-20 Hz) frequency component images were merged into the RGB channels of a 24-bit color image. FIGS. 7 and 9-16 highlight the dramatically improved contrast and functional information content made available by d-μOCT for a variety of different tissue types and over a large frequency range. Key findings include:

1. d-μOCT provides cross-sectional, subcellular images of motility with increased cellular contrast compared to standard μOCT for a wide variety of tissues (FIGS. 7, 9-16).

Figure 9:
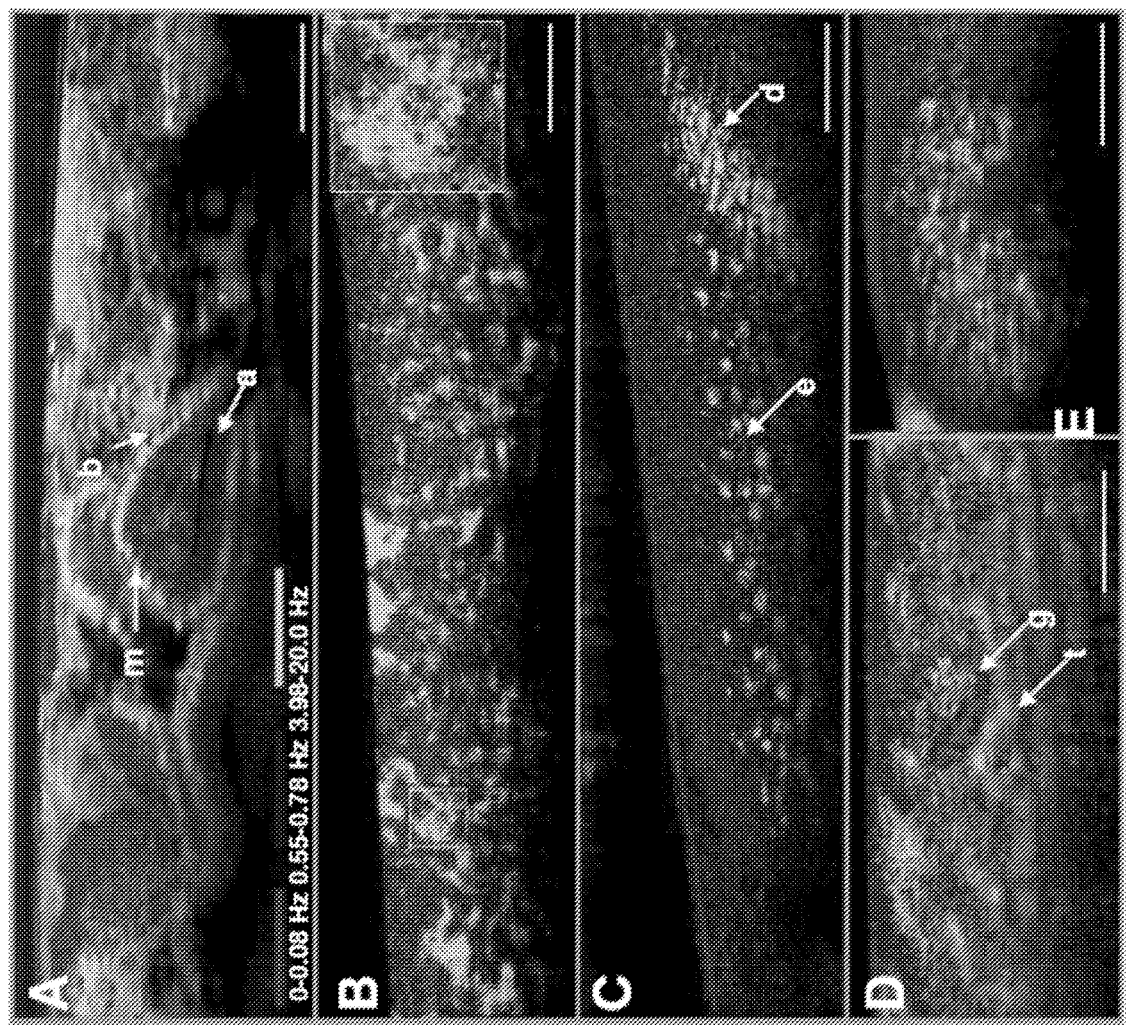
FIG. 9 shows cross-sectional d-μOCT images of freshly excised human and animal tissues. Panel (A) shows a biopsy from the human gastric cardia demonstrating glands containing cells with low frequency regions at their base (b), high-frequency modulation in the middle (m), and low frequency apically (a). Panel (B) shows swine liver showing sinusoids, hepatic cords, and a hepatocyte in the inset. Panel (C) shows human hippocampus (CA3) showing the dentate fascicle (d) and endplate (e) neurons. Panel (D) shows mouse kidney renal tubules (t) and a glomerulus (g). Panel (E) shows swine lymph node follicle containing various lymphoid cells displaying unique frequency signatures. Bars, 100 μm.
Figure 11:
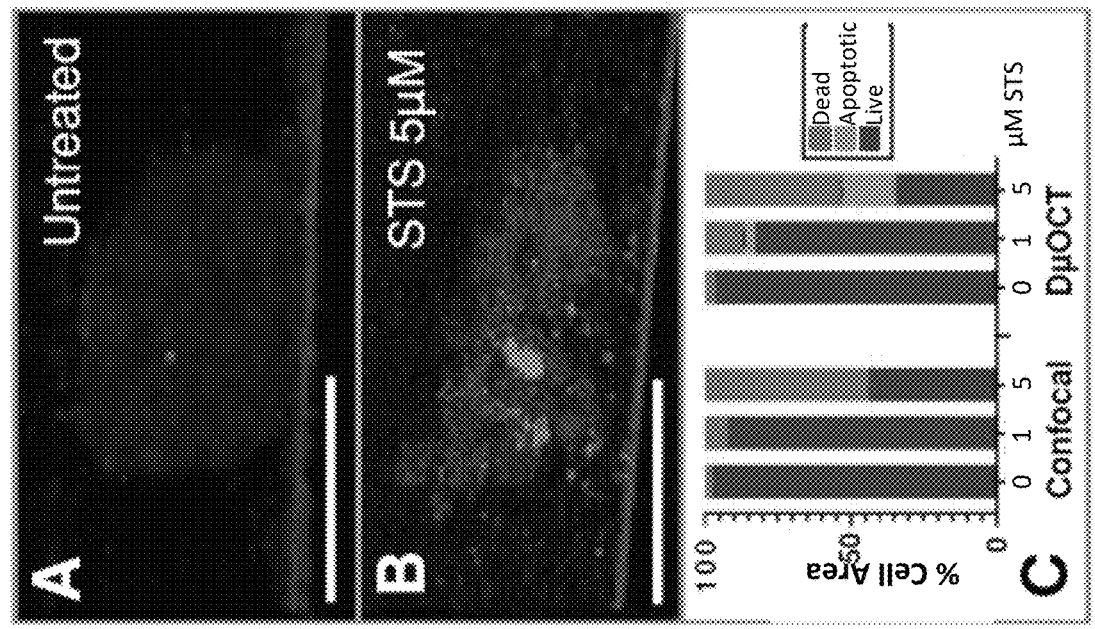
FIG. 11 shows d-μOCT data from B16F10 spheroids treated with toxic doses of Staurosporine (STS) for 48 hrs. Panel (A) shows control untreated spheroid and panel (B) shows spheroid treated with 5 μM STS. In spheroid d-μOCT, based on prior validation data (not shown), live cells are blue, apoptotic cells green, and dead cells red. Panel (C) shows bar charts showing a high degree of correspondence between the gold standard confocal microscopy of Hoechst and Propidium Iodide stained spheroids and d-μOCT for live/dead cell areas as a function of drug concentration. For panels (A), (B): Red 0-0.08 Hz, Blue 0.47-0.63 Hz, Green 3.98-20 Hz. Bars, 100 μm.
Figure 16:
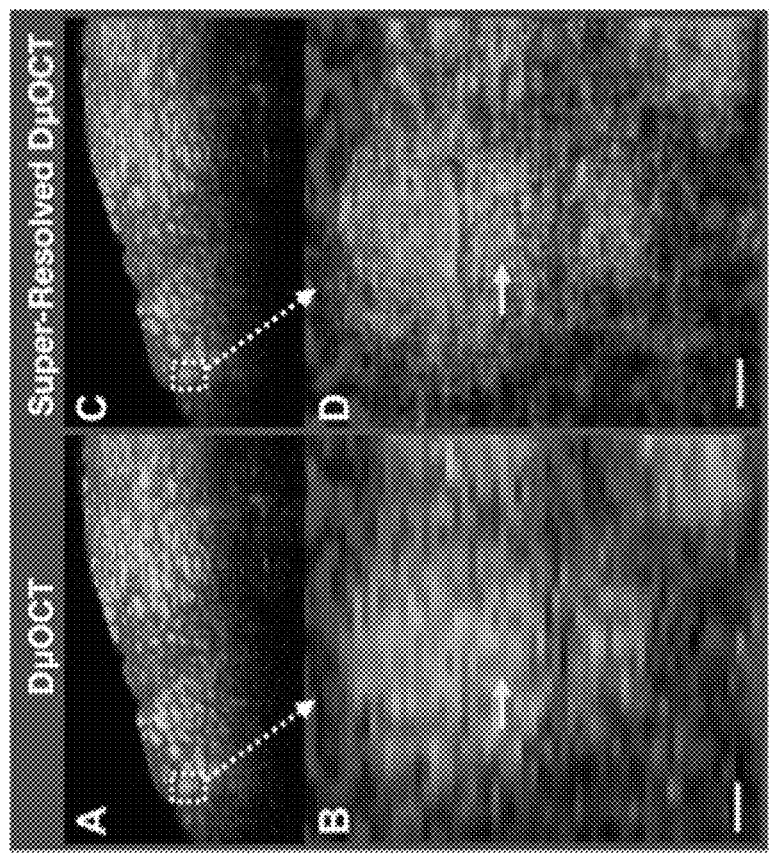
FIG. 16 shows cross-sectional d-μOCT images of a human esophageal biopsy. Panel (A) shows a standard d-μOCT image. Panel (B) shows a magnified region of panel (A) which shows a cell with a central, poorly delineated blue region of mid-frequency content (arrow). Panel (C) shows a super-resolved d-μOCT image computed from the same dataset. Panel (D) shows a magnified portion of panel (C) exhibiting significant resolution enhancement. The super-resolved d-μOCT image shows that the blue mid-frequency motion content (arrow) exists along a well-defined curvilinear path. d-μOCT color codes: Red 0-0.08 Hz, Blue 0.47-0.63 Hz, Green 3.98-20 Hz. Bars, 10 μm.

2. Intracellular features can be visualized based on modulation frequency discrimination (FIGS. 7, 9, 16).

3. Spatiotemporal information can be used to encode cell type and/or state (FIGS. 7, 9-15).

4. The cross-sectional imaging and frequency encoding capability of d-μOCT enables the observation of the functional maturation of epithelial cells from the basal layer to the surface (FIGS. 7, 10, 15, 16).

Figure 10:
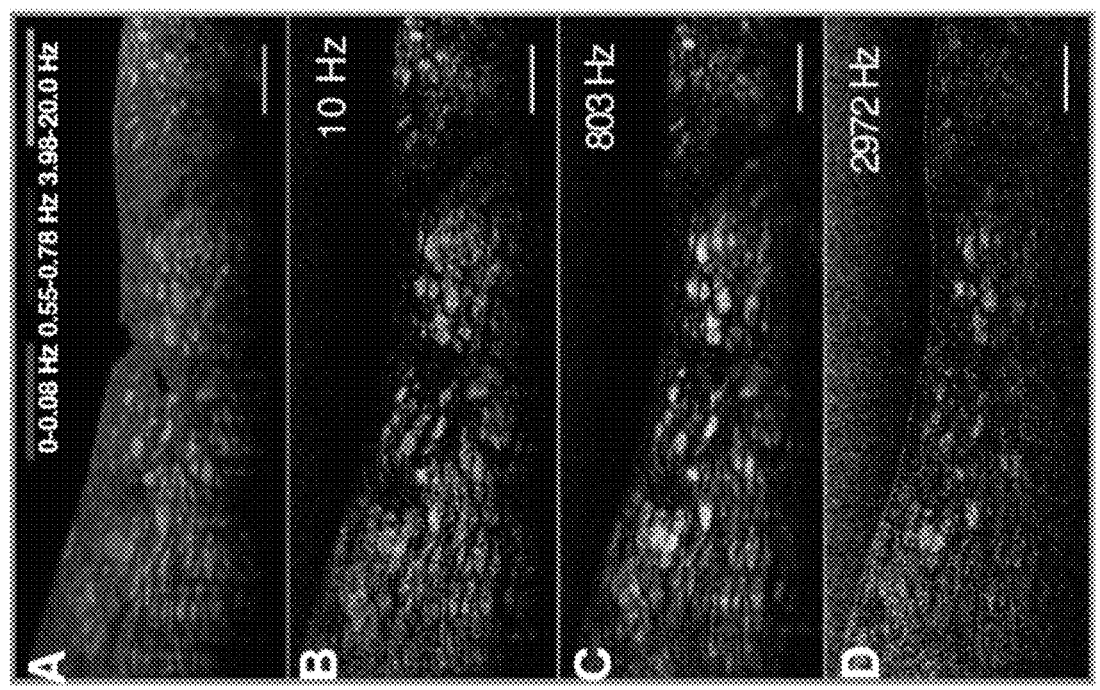
FIG. 10 shows cross-sectional d-μOCT images of a human esophageal biopsy. Panel (A) shows a pseudocolored d-μOCT image showing different cells exhibiting various intracellular motion-associated frequency content. Panels (B)-(D) show intracellular dynamics probed over a wide frequency range, panel (B) at 10 Hz, panel (C) at 803 Hz, and panel (D) at 2972 Hz. Notably, the same cell types exhibit distinct frequency signatures. Bars, 100 μm.

5. d-μOCT enables the interrogation heretofore unrecognized high-frequency content in the kHz range (FIG. 10).

Figure 13:
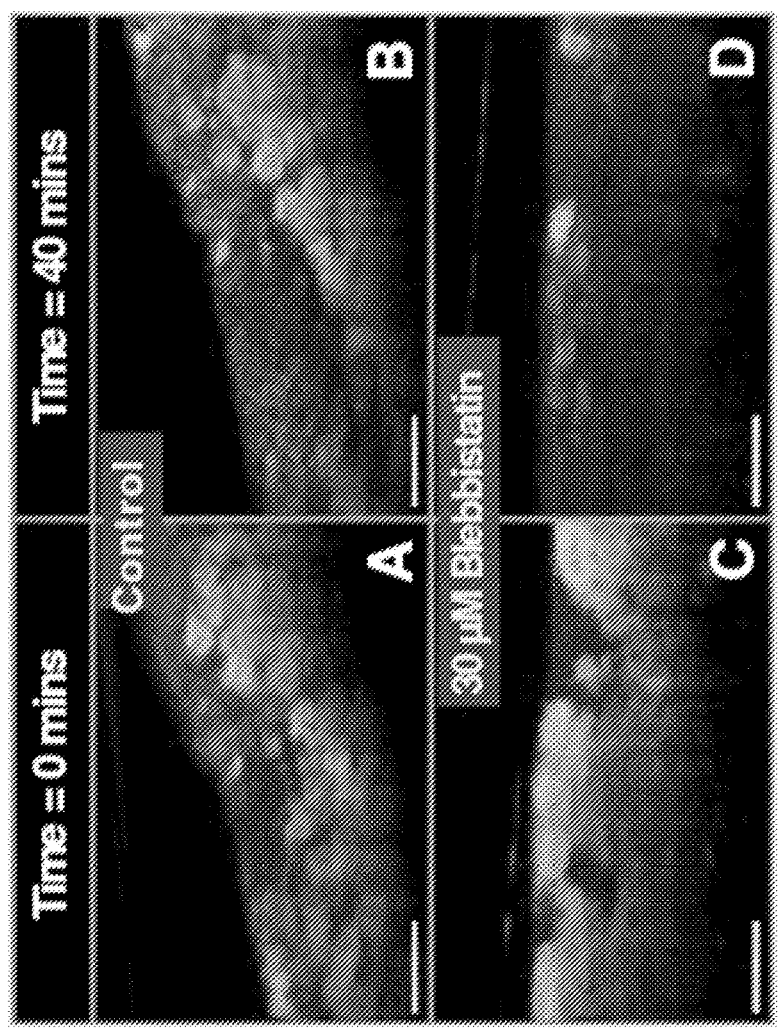
FIG. 13 shows cross-sectional d-μOCT images of freshly excised murine liver. Panel (A) shows control untreated liver at t=0 and panel (B) at t=40 minutes, demonstrating similar frequency content at both time points. Panel (C) shows liver in 30 μm blebbistatin at t=0 and (D) t=40 minutes showing a dramatic reduction in high frequency (green) and increase in low frequency (red) intracellular motion following treatment. d-μOCT color codes: Red 0-0.08 Hz, Blue 0.47-0.63 Hz, Green 3.98-20 Hz. Bars, 100 μm.
Figure 12:
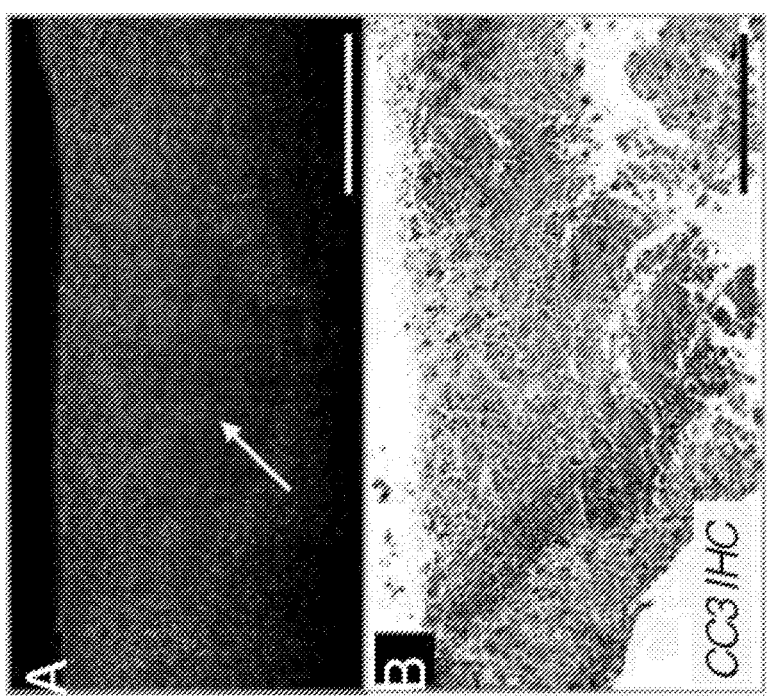
FIG. 12 shows images of a freshly excised MC38 murine tumor treated with an IMD containing doxorubicin (6 hrs). Panel (A) shows d-μOCT image showing a diffuse region of mid-frequency content (arrow) that mirrors cleaved caspase-3 (CC3) IHC. Panel (B) is from the same location in the sample. d-μOCT color codes: Red 0-0.08 Hz, Blue 0.47-0.63 Hz, Green 3.98-20 Hz. Bars, 200 μm.

6. d-μOCT shows a distinct change in intracellular modulation indicative of cell viability after application of a therapeutic agent in spheroids (FIG. 11) and tissue (FIGS. 12, 13).

7. d-μOCT highlights inflammation influx (FIG. 14) induced by chemotherapeutic agents.

Figure 15:
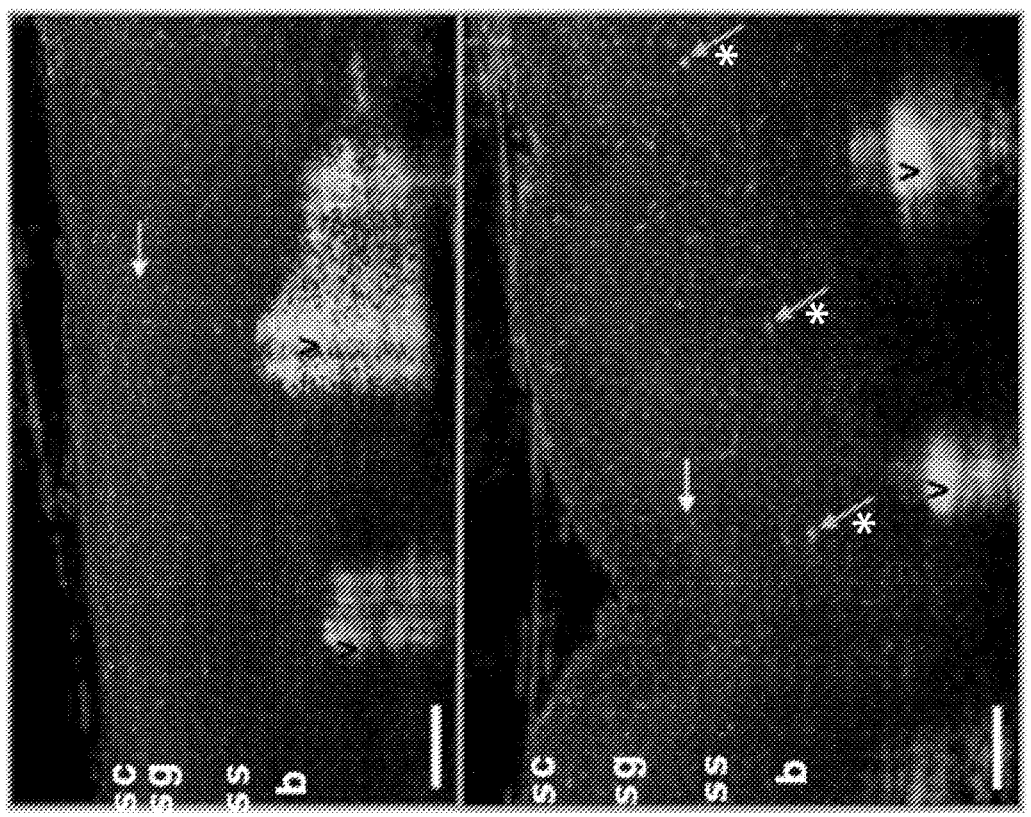
FIG. 15 shows d-μOCT Images of human skin obtained from the dorsal forearm in vivo. The maturation pattern of the skin can be clearly identified in the transition from the basal layer (b, blue) to the stratum corneum (sc, red). White arrows show the stratum granulosum (sg), which may be more active (blue) due to keratin production in these cells. Bottom image shows cells with more high frequency content in the stratum *spinosum* (ss) and adjacent to the basal layer (orange arrows with adjacent asterisks '*'). Blood vessels with high frequency motion (v, green) are also seen in the dermis. d-μOCT color codes: Red 0-0.08 Hz, Blue 0.47-0.63 Hz, Green 3.98-20 Hz. Bars, 100 μm.
Figure 14:
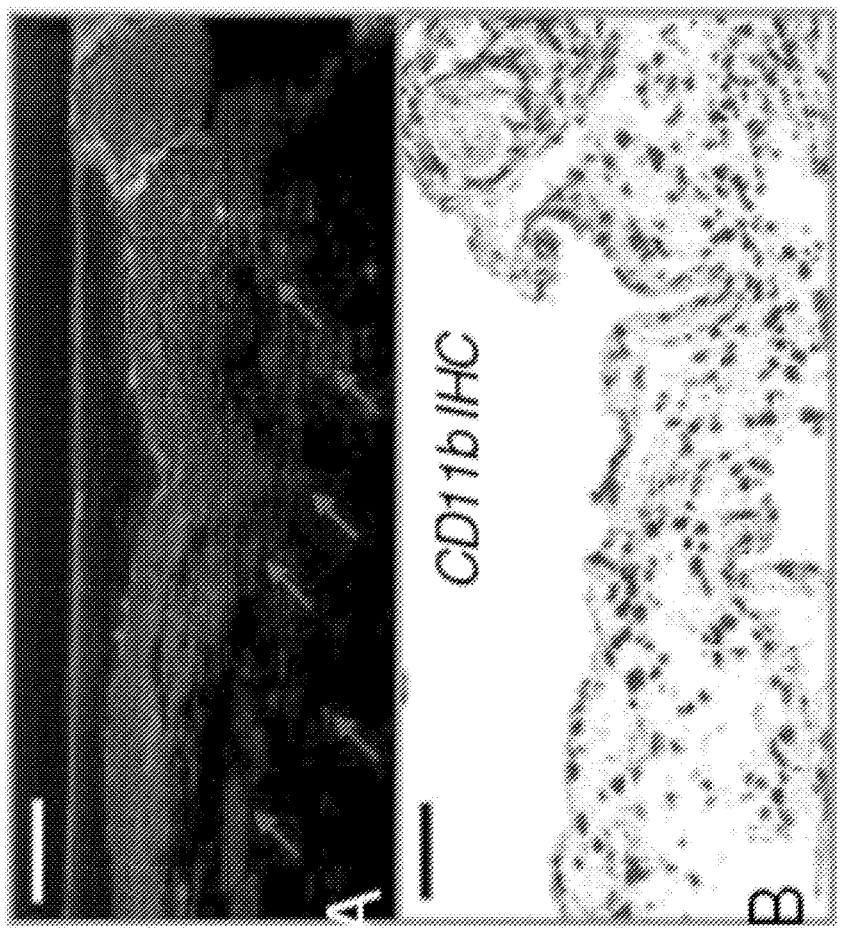
FIG. 14 shows images of a freshly excised murine MC-38 tumor primed by stimulator of interferon genes (STING, 48 hrs). Panel (A) shows d-μOCT image showing mid-frequency content blue cells (arrows) in the tumor, confirmed to be infiltrating neutrophils by CD11b IHC in panel (B) from the same location in the sample. d-μOCT color codes: Red 0-0.08 Hz, Blue 0.47-0.63 Hz, Green 3.9820 Hz. Bars, 100 μm.

8. d-μOCT enables high-contrast, functional imaging in human skin in vivo (FIG. 15).

Determining the biological significance of d-μOCT in cells and tissue.

Determining the accuracy of d-μOCT for discriminating clinically relevant human cell/tissue types.

Initial data (FIGS. 7, 9-16) shows that d-μOCT provides greatly improved morphologic contrast compared to conventional μOCT (e.g. FIG. 7A), however the degree to which d-μOCT can discriminate different human cells and tissue types is unknown. An atlas may be created of d-μOCT images of clinically relevant human tissue that is matched to histology/IHC on the cellular level. This data may be used in available machine learning pipelines to determine the accuracy of d-μOCT for microscopic morphologic diagnosis. Results provide the basis for implementing d-μOCT for the pathologic diagnosis of human tissues.

Type and number of specimens. Tissues from biopsies and human surgical specimens of normal, dysplastic, and malignant epithelia, solid tumors, and lymph nodes (Table 1). These tissue types may be used based on their availability, clinical relevance, and diversity of relevant cell types. Sample sizes of various numbers (e.g. n=10 specimens per tissue type) may be used from different patients. Approximately 10 distinct d-μOCT sections per specimen may be imaged, processed, and analyzed.

TABLE 1

| Tissue types analyzed. | | | |
|---|---|---|---|
| Skin | | Exocervix | |
| | Normal | | Normal |
| | Benign Pigmented Lesions | | LSIL |
| | | | HSIL |
| | Dysplastic Lesions | Lung | |
| | Melanoma | | Normal |
| | Basal Cell Carcinoma | | Squamous Cell Cancer |
| | Squamous Carcinoma | | |
| GI tract | | | Adenocarcinoma |
| | Normal Esophagus | | Large Cell Carcinoma |
| | Barrett's Esophagus (BE) | Breast | |
| | Dysplastic BE | | Normal |
| | Esophageal Adenocarcinoma | | DCIS |
| | | | Ductal Carcinoma |
| | Normal Stomach | | LCIS |
| | Normal Duodenum | | Lobular Carcinoma |
| | Normal Colon | Lymph Nodes | |
| | Adenomatous Polyps | | |
| | Colon Carcinoma | | | d-μOCT imaging. Imaging may be conducted initially with conventional bench top d-μOCT, as disclosed above, although advanced d-μOCT technology may be incorporated. Imaging may be performed on fresh tissues, less than one hour after resection. Specimens may be cut into 200 μm-thick sections, placed in a specimen holder that facilitates diffusion through the cut surfaces, and immersed in culture media. Tissues may be imaged at room temperature or at 37° C., with the epithelial surface facing upwards (when relevant) to facilitate imaging. After imaging, the location of the d-μOCT cross-section may be marked on the tissue via fine laser cautery on the top and bottom of the sample. Laser cautery may be overmarked with a fluorescent and/or absorbing ink that may be visible by histology.

Histological processing. Tissue may be formalin fixed and paraffin embedded (FFPE). 3D serial sections, separated by 4 µm, may be cut. Virtual H&E (VHE) stains may be computed from autofluorescence images input into a convolutional neural network (CNN) trained on a generative adversarial network (GAN). Sections may then undergo DAPI staining (to label nuclei) and tissue-based cyclic immunofluorescence (t-CyCIF). Cell types of interest may be identified by specific IHC markers, examples of which are in Table 2. 3D datasets may be registered, warped, and reformatted so that top and bottom marks are in matching d-µOCT and VHE/IHC images. Additional dataset warping may be conducted so that the same cells are seen in both the VHE/IHC and d-µOCT images.

TABLE 2

Examples of cell types and IHC markers used in studies.

| | |
|---|---|
| T cells | CD3+ |
| B cells | CD79a, CD20 |
| NK cells | CD3− CD56+ |
| Monocytes | CD11b+ |
| Macrophages | CD68/F480 |
| Neutrophils | CD11b+, Ly6G+ |
| Fibroblasts | Vimentin+ |
| Epithelial cells | BER-EP4, pan-cylokeratin, EpCAM |
| Malignancy | Epcam, p53, panCK (organ & model specific: e.g. PyMT, CD45) |

Cell type analysis. d-µOCT periodogram images may be computed using standard procedures or by more advanced algorithms and input into custom CellProfiler machine learning pipelines. Training and refinement may generate rules via CellProfiler Analyst, using t-CyCIF and VHE-determined cell type as ground truth. Accuracy of classification may be conducted prospectively.

Tissue diagnosis analysis. Blinded pathologists may render consensus diagnoses of d-µOCT sections, based on 1) d-µOCT images and 2) d-µOCT images with overlaid cell type classification. Sensitivity/specificity for each tissue/disease type may be measured using VHE diagnosis as the gold standard.

Statistical rationale for number of specimens. Given 100 images per tissue type and a minimum of 100 cells per image, it is anticipated that there may be more than 10,000 cells per tissue type identified by d-µOCT. Considering a least-abundant class of 5%, we may have a minimum of 500 positive cells to train, refine, and validate. Anticipating a sensitivity and specificity of 90%, and assuming 1:1:1 distribution of samples for training, refinement, and validation, 95% confidence intervals of +5% for sensitivity and +1% for specificity may be attained.

Additional approaches-image registration. Additional methods to improve dataset registration may be implemented, including the use of high precision tape sections and 3D OCT or Micro-CT imaging of the PPFE block to provide 3D warping boundary conditions. Frequency content may vary with cell state. Since d-µOCT provides a measure of cell activity, there may be multiple distinct d-µOCT periodograms that correspond to the same cell type by IHC.

Number of samples is insufficient for rare cell types. If the number of samples is insufficient for proper analysis of rare cell types, one may enrich by selecting alternative tissues (e.g. tonsils for lymphoid cells), increasing the number of samples, and/or utilizing other techniques such as k-fold cross validation.

Virtual H&E. VHE generated through autofluorescence is used here to ensure that all slides and images are from the same plane in a manner that does not interfere with antigen retrieval. Should VHE be inadequate for pathologic diagnosis, VHE could be generated using other fluorescence agents (e.g. DAPI and eosin).

Use of d-µOCT to discriminate live/apoptotic/dead cells in spheroids.

Methods which are capable of rapidly detecting live/apoptotic/dead cells in 3D culture models without altering the specimen are expected to increase efficiency in this growing area of biomedical research. Preliminary data (FIG. 11) and other coherence-based motility studies suggest that d-µOCT may be used for evaluating cell viability in samples such as spheroids. Here, the capability of d-µOCT may be validated to differentiate live/apoptotic/dead cells in 3D cultures by imaging treated spheroids from multiple different human and murine melanoma cell lines. d-µOCT images may be compared to gold standard, fluorescence-based analysis of cell death with Hoechst-33342, annexin V-FITC, and propidium iodide (PI) staining. Results may establish the accuracy of d-µOCT for this assay, making it a viable alternative for cell viability assessment in 3D culture models.

Type and number of specimens. Cell types may be utilized that are representative of those used in 3D culture research to ensure that the results are consistent across a spectrum of biological and pharmacological conditions. Initial studies may use murine melanoma cells (e.g. B16.F10). Subsequent experiments may be conducted using differentiated (e.g. A375) and de-differentiated (e.g. RPMI7951) human melanoma cells.

Spheroid growth and treatment. Details on the generation of spheroids is described in detail in the literature. Briefly, tumor cells ($1\times10^6$) may be seeded in a 10-cm ultra-low attachment (ULA) plate to promote spheroid formation. After 24-48 hours, S2 (40-100 µm) spheroid fractions may be pelleted and resuspended in type I rat tail collagen (Corning) at a concentration of 2.5 mg/mL following the addition of 10×PBS with phenol red with pH adjusted using NaOH. The spheroid-collagen mixture may then be injected into the center gel region of the 3D microfluidic culture device (DAX-1 Chip AIM Biotech). After 30 minutes at 37° C., collagen hydrogels containing tumor spheroids may be hydrated with media (10% FBS/DMEM with 1% penicillin-streptomycin) with drugs that induce cell death (e.g. staurosporine STS 1-5 UM) or vehicle control (0.1% DMSO) for 24-48 hours.

d-µOCT imaging. The entire culture chip may be imaged by d-µOCT in three-dimensions, noting the spatial location of each spheroid for future comparison to confocal or two-photon microscopy on a per-spheroid basis.

Assay: After d-µOCT imaging, spheroids may be processed for on-chip live/apoptotic/dead staining with Hoechst/PI+/− annexin V-FITC staining. Dual labeling may be performed by loading microfluidic device with Hoechst (Ho) and propidium iodide (PI) from Nexcelom, as previously described.

Confocal microscopy. Following staining, spheroids may undergo confocal microscopy. Live cells stain with Hoechst-33342, but are negative for surface staining of annexin V, and have intact cell membranes and therefore exclude PI. Early apoptotic cells acquire annexin V positivity but exclude PI. Dead cells (late apoptosis or necrosis) stain for PI with or without annexin V staining.

Analysis. d-µOCT images may be registered one-to-one with confocal or two-photon microscopy images of each cell. d-µOCT periodogram images may trained and refined via a custom CellProfiler Analyst pipeline, using confocal-determined cell state as ground truth. Agreement of cell state type (live/apoptotic/dead) may be determined prospectively and quantified using Cohen's kappa statistic.

Additional approaches-cell type diversity. To confirm accuracy of d-µOCT imaging regardless of growth pattern, multiple human and murine cell types may be evaluated.

Alternative agents. Initial studies may use STS, a well-established pan-protein kinase C (PKC) inhibitor that induces caspase-dependent and -independent cell death. To evaluate more physiologically or clinically relevant stimuli, spheroids may be treated with exogenous inflammatory cytokines (e.g. TNFa+/−IFNg) to mimic an antitumor immune response and/or small molecules targeting the MAP kinase (MAPK pathway).

Determine the capacity of d-µOCT to detect tumor response to anti-cancer drugs in tissue.

Rapidly identifying whether a patient is responding to a systemic therapy is an unmet clinical need in oncology. Preliminary data (FIGS. 11-13) and other intracellular motility research suggest that d-µOCT should be capable of detecting a motion signature that corresponds to cellular apoptosis and death in tissue, yet its sensitivity and specificity is unknown. To fill this gap, d-µOCT imaging may be conducted on previously treated murine tumors ex vivo. Measurements may be compared to IHC markers associated with drug efficacy. The data may define frequency signatures that correspond to drug response, including apoptosis, necrosis, or proliferative arrest, and may allow determination of the accuracy of d-OCT for detecting these phenotypes in treated tissues.

Approach for in vivo drug response measurements. To expose live tumors to the chemotherapeutic drugs, one may utilize IMDs that are placed directly into the tumor, releasing microdoses of various drugs into confined regions of tumor in well-defined concentration gradients. The drug delivery microdevice is advantageous because it creates highly controllable, confined regions of drug exposure in the tumor. The devices also allow measurement of a large set of drug perturbations per mouse (each device has up to 20 reservoirs). Implant microdevices may be loaded with reservoirs of chemotherapeutic agents such as Doxorubicin, Cisplatin, Olaparib and Topotecan directly into tumors of exemplary sizes of 300-400 mm3. Intratumoral delivery may be performed at four local doses, corresponding to the IC50, 1/10th IC50, 1/3rd IC50, and 3× IC50. Previous measurements with this system have shown apoptosis induction to be most prevalent between 6 h-48 h of tissue exposure. To capture the various stages of therapeutic activity and account for potentially differential apoptosis induction kinetics among the set of drugs, drug delivery IMDs may remain implanted in the tumors for three time points: for example, 6 h, 24 h and 48 h. For each time point, replicate measurements may be performed for each of the two tumor models. Each of the four drugs may be present on every microdevice at the four concentrations described above (each microdevice may test these 16 conditions in loaded reservoirs, plus we have 4 control/vehicle reservoirs). Using n=8 replicate samples across 3 time points in the two tumor models may require a total of 48 tumors/mice. At the time of tissue harvest, the tumors may be explanted from the animal and immediately transferred to d-µOCT imaging. Unused portions of the tumors may be reserved.

d-µOCT imaging and histological processing. d-µOCT imaging and marking may be conducted on excised tumors as described above. Following d-µOCT, tumor samples may be FFPE processed and sectioned with care to ensure cellular level registration. Slides may undergo multiplexed IHC staining with established markers for apoptosis and cell death (e.g., cleaved caspase-3 and -8, cleaved PARP, ph-g-H2AX, and ph-S6). VHE may be generated.

Analysis. For each drug, one may score its anti-tumor effect based on the percentage of positively stained cells for each IHC marker (e.g. the apoptotic index=[#cleaved caspase-3+ cells]/[total #cells] in a given ROI). Multiple markers associated with cell death may be used because cleaved caspase-3 is expressed transiently throughout the cellular apoptotic process. d-µOCT periodogram images may be computed as described above. d-HOCT periodograms may be input into software algorithms such as CellProfiler machine learning pipelines, and classification rules generated via software such as CellProfiler Analyst, using IHC indices of apoptosis or necrosis as ground truth.

Statistical rationale for number of animals. Given the observed variabilities from tumor responses to the drugs being used in this study and the differences in sensitivity between the two cell lines in-vitro, n=8 replicates per measurement may provide statistically significant differences with $p<0.05$ and a value of $\alpha=0.05$ in measured drug responses by ground truth IHC. Assuming that d-µOCT has a diagnostic sensitivity/specificity here of 90%, pooled across all time points, 24 animals per tumor model may provide 95% confidence intervals of ±12%.

Sex and other relevant biological variables. Female mice may be used, as these are ovarian tumors.

Additional approaches-alternative tumor models. In addition to SKOV-3 and OVCAR-3, to extend the breadth of cancer types, this study will be conducted with other human tumor models with different responses to commonly used chemotherapeutics, such as A375, BT474 and PC3.

Determine how the d-µOCT signal changes with cellular activity, proliferation, and metabolism.

One hallmark of cancer cells is an increased rate of proliferation relative to the host tissue. The proliferative rate of malignant cells has also been shown to be a prognostic marker of tumor aggressiveness and survival as well as a limited predictor of drug response to cytotoxic chemotherapy. A hypothesis, supported by prior coherence-based motility studies, is that proliferation, effectuated by increased metabolism, organelle transport, and intracellular cytoskeletal reorganization may be reflected in the d-µOCT signal. To test this hypothesis, well-characterized pharmacological inhibitors (Table 3) of specific molecular processes related to proliferation may be used to address the contribution of each cellular process on the d-µOCT signature. This has high translational relevance; if d-µOCT could determine a tumor's proliferative activity, it would enable therapeutic efficacy to be assessed less invasively and much earlier than currently feasible.

Tumor cells are the ideal model system for this study, as they are highly proliferative, motile, and have significantly elevated metabolism. The SKOV-3 ovarian cancer human tumor model is one example of an appropriate system. This model reliably yields solid, mostly non-necrotic tumors in mice over the course of 3 weeks. It is highly proliferative, with a cellular doubling time of ~24-36 h, rendering it susceptible to the agents in Table 3. Specimens will be from excess tumor tissue generated.

TABLE 3

Overview of targeted drug treatments.

| MECHANISM | DRUG NAME | TARGETED EFFECT |
|---|---|---|
| CYTO-SKELETAL EFFECTS | Cytochalasin D | Prevents actin polymerization |
| | Jasplakinolide | Enhances actin polymerization |
| | Phalloidin | Stabilizes actin filaments |
| | Colchicine | Prevents microtubule polymerization |
| | Demecolcine | Microtubule depolymerization |
| | Paclitaxel | Stabilizes microtubules |
| | Vinblastine | Prevents microtubule polymerization |
| METABOLIC EFFECTS | GNE-140 | Glycolysis inhibitor |
| | Etomoxir | Fatty acid metabolism |
| | Sulfasalazine | Amino acid metabolism |
| | P7C3 | NAD biosynthesis inhibitor |
| | Oligomycin | ATP synthase inhibitor |
| PRO-LIFERATION AND GROWTH | Rapamycin | mTOR inhibitor (reduces cell growth) |
| | Cisplatin | Antiproliferative chemotherapeutic |

Approach for Tumor Proliferation Modulation:

Longitudinal imaging with an established baseline signal and monitoring at multiple time points over a 24 h period following drug perturbation may provide a comprehensive assessment of d-µOCT signal changes due to drug activity. Therefore, a tissue slice model of SKOV-3 tumors may be employed. Briefly, freshly excised tumors may be sectioned on a tumor matrix or vibratome to a thickness of 500 µm while in culture media. Sections may subsequently be transferred to an organotypic support on a plate capable of holding multiple sections and cross-sectional imaging, filled with culture media. The plate containing the slices may then be kept in a controlled culture chamber at 37° C. and 5% $CO_2$ in a humidified atmosphere for the imaging duration. For each of the agents listed in Table 3, a given tumor section may be treated with drug at three concentrations: IC50, ⅓rd IC50, and 3× IC50. Additional wells may contain tumor sections treated with vehicle only. For each drug/concentration, n=8 tissue slices may be treated in individual wells under identical conditions.

d-µOCT imaging and histology: d-µOCT imaging may take place as described above. One may obtain baseline images immediately prior to the addition of the pharmacological compound, and then 30 minutes, 1 h, 2 h, 6 h, 12 h, and 24 h thereafter. After imaging, tissue may be FFPE and sectioned to create 3D serial H&E slides. Additional IHC staining may be used to confirm specific pathway and anti-proliferative effects (e.g. ki67).

Analysis. d-µOCT data from drug-treated wells may be normalized against data from vehicle treated specimens to account for potential sample degradation. Then, d-µOCT periodogram images may be computed as described above. The change in d-µOCT periodograms may be assessed on a per pixel, cell, and tissue basis as a function of drug, concentration, and time point.

Additional approaches-tissue degradation. If significant tissue degradation in the untreated vehicle samples is observed, one may exchange the growth media at regular intervals between d-µOCT measurements. Tissue slice thickness can additionally be reduced to improve nutrient diffusion in the center of the specimen. One may also integrate an available media perfusion system into the controlled culture chamber.

Development of new d-µOCT technology for improving intracellular motion characterization: Increasing spatial and frequency resolution of d-µOCT Optical spatial resolution. Table 4 shows the spatial resolution performance parameters of the current and new d-µOCT systems. Optical spatial resolution may be improved by one or more of: 1) decreasing the center wavelength of the µOCT light source from 800 nm to 700 nm; 2) increasing its bandwidth from 300 nm to 400 nm; 3) increasing the numerical aperture (NA) of the sample arm lens from NA=0.12 to NA=0.2; and 4) implementing extended depth of focus (EDOF) technology which has been shown to extend the DOF by more than 20-fold, while maintaining cross-sectional imaging over a range of 300 µm. Although one may attempt to exceed this spatial resolution performance, the parameters in Table 4 were conservatively chosen to provide a doubling of axial and lateral resolutions without significantly compromising cross-sectional imaging performance or penetration depth. The spatial resolution of the new d-µOCT system may be validated using knife-edge scanning, z-scanning, and imaging of resolution standards and excised tissue. Success may be defined as demonstration of a factor of two improved resolution along x, y, and/or z dimensions.

TABLE 4

Resolution parameters for d-µOCT systems.

| Parameter | Current | New |
|---|---|---|
| Center wavelength (µm) | 0.80 | 0.70 |
| Bandwidth (µm, FWHM) | 0.30 | 0.40 |
| Delta z (µm, air) | 0.87 | 0.50 |
| Numerical aperture (NA) | 0.12 | 0.20 |
| Delta x (µm, FWHM) | 2.49 | 1.31 |
| Standard DOF (µm) | 35.30 | 11.16 |
| DOF extension factor | 8 | 27 |
| EDOF (µm) | 300 | 300 |

Computational spatial super-resolution. With d-µOCT, multiple images or A-lines are acquired from the same location of the sample in the presence of both intracellular motion (the signal) and bulk motion that occurs on a larger scale. In addition, µOCT EDOF technology that focuses annular patterns onto the sample aliases high spatial frequency information into the lens. Bulk motion and aliasing make it possible to computationally increase spatial resolution without modifying the setup or acquisition process. FIG. 16 shows a standard and spatially super-resolved d-µOCT image that were generated from the same µOCT dataset. The superresolved image was computed using Gauss-Newton non-linear least squares minimization with hybrid bidiagonalization regularization, and whole-image affine transformation geometric warping. Here, one may improve the accuracy and performance of this algorithm by incorporating multi-scale local registration and elastic unwarping. In conjunction with 3D beam scanning, one may recover out-of-plane data to reconstruct the super-resolved image in three-dimensions. Results may be validated using same methods as above and by comparing super-resolved images of phantoms and tissue to corresponding histopathology. Success may be defined as demonstration of a two-fold resolution increase.

Computational frequency super-resolution. Increased frequency resolution could significantly improve the discriminative capacity of d-µOCT, especially at lower frequencies (0-10 Hz), where a considerable portion of intracellular motion takes place. Since the total measurement duration determines the frequency resolution, one may explore whether longer acquisitions provide additional frequency information content. Yet, extending acquisition times is undesirable for many scenarios and is untenable in vivo. One may therefore investigate computing d-μOCT periodograms using high resolution DFT (HRDFT) and extended DFT (EDFT) algorithms that can increase power spectra frequency resolution within a discrete bandwidth without altering the total acquisition time. Frequency resolutions may be tested using magnetically modulated microbeads incorporated in phantoms, cells, and tissues. Success may be defined as demonstration of a two-fold improvement in frequency resolution between 0-10 Hz.

Develop new algorithms for processing and extracting more information from the d-μOCT signal.

Time-frequency analysis (TFA). Short time Fourier transform (STFT) analysis of d-μOCT tissue motility signals indicates that the motion within cells is non-stationary. Thus, more information can be potentially extracted from d-μOCT using TFA. While the Stockwell transform (ST) may be used, owing to its super-resolution capabilities at low frequencies, other possible procedures including STFT, Wavelets, Wigner-Ville, the Constant-Q Gabor transform, and other time-frequency representations may be utilized to improve discrimination. TFA may be applied to signals after 3D elastic unwarping. Feature extraction may be conducted using energy concentration hybrid classification schemes and time-frequency cluster analysis. d-HOCT images of magnetomotive phantoms excited via pre-determined, non-stationary waveforms may be obtained. TFA may be compared to the known frequency stimuli, with success defined as less than 10% variation.

Machine learning. To mine d-μOCT data further, one may train deep neural networks (NN) to jointly model morphological and functional features and learn spatiotemporal representations that may group individual image pixels into biologically relevant categories. The input may be d-μOCT periodograms and matched histology datasets acquired above, and the output may be series of two-dimensional probabilistic segmentation images-one for each biological category of interest. One may employ recurrent convolutional NNs and fully convolutional NNs, which can jointly model dynamic patterns in a spatial tissue context. To train models, one will apply both supervised and semi-supervised learning approaches using graphic image annotation strategies for obtaining pixel-level ground truth labels. To select a final NN model, one will train many models for a wide variety of network architectures and hyperparameters on the training set. One will then chose the model that performs best on a hold-out validation set to identify the optimal model depth, width, and resolution. To evaluate the selected model and estimate the generalization error, one will use a separate test data set compare quantitative measurements derived from semantic segmentations predicted by a model for a given image with the expected histological patterns for the known cell/tissue types and pathology. One will further analyze resulting NN-generated single-cell measurements using multivariate statistics and unsupervised machine learning to cluster cells based on their phenotype, frequency content, viability, and activation states. One may create lower dimensional representations (e.g. t-SNE, UMAP) of these high-dimensional data sets to facilitate visualization and discovery of interesting subpopulations.

Develop and test methods for conducing d-μOCT in vivo.

Multiplane beam scanning. Two-dimensional elastic unwarping can correct in-plane, bulk motion, but is incapable of retrieving data that has moved out of the imaging plane. To mitigate this issue, one may develop new beam scanning techniques that acquire d-μOCT images in multiple, adjacent cross-sectional planes and may conduct registration and elastic unwarping in three dimensions. Our first approach for multiplane scanning may be to raster dither the beam (FIG. 8, scan mode 3). If it becomes necessary to retain higher frequency information, d-μOCT imaging of coherence multiplexed or optically switched images from out-of-plane, spatially offset sample beams (FIG. 8, scan mode 4) may be implemented. Because these beam scanning techniques obtain 3D information, one also may utilize this data to determine motion vectors, in a manner similar to diffusion tensor MRI. d-μOCT results from 3D unwarped and static images of excised tissue with and without deterministic sample out-of-plane motion may be compared using image comparison metrics (ICM): Mean Squared Error (MSE), structural similarity indices (SSIM), or Mander's overlap coefficients. Success may be defined as less than 10% variation in frequency content between in-plane and out-of-plane motion cases.

d-μOCT handheld probe with stabilization. It has been possible to mechanically stabilize and acquire d-μOCT images of human skin with a bench top microscope in vivo (FIG. 15). To expand the in vivo applications of d-μOCT, a 15 mm diameter, handheld d-μOCT probe with integrated stabilization technology is presented which may be applicable to imaging external surfaces for dermatologic and surgical applications. The probe may be specifically designed to overcome challenges associated with long acquisition times and sub-μm precision. Beam scanning may be conducted using MEMS and/or micro-galvanometer technology that may generate repeatable beam scan patterns, including those required for standard (FIG. 8, scan mode 1), high frequency (FIG. 8, scan mode 2), and multiplane imaging (FIG. 8, scan modes 3 and 4). The probe may integrate mechanical and suction stabilization techniques, implement active image feedback and beam scanner control, and scan patterns that are gated to physiological conditions such as cardiac, respiratory, and/or peristaltic cycles.

After the d-μOCT handheld probe is developed, the feasibility of using this technology to obtain skin images in vivo may be tested in a clinical pilot study of patients undergoing elective lesion excision (e.g. n=10:5 males/5 females). 3D imaging of the lesion may take place in vivo prior to excision. Once excised, the specimen may be placed in media and imaged again in 3D with the bench top d-μOCT system ex vivo. The excision may then be sent to pathology per standard of care. d-μOCT images of human skin obtained in vivo may be compared to those acquired ex vivo using frequency dependent ICM. Assuming a correlation of 0.9 between corresponding in vivo and ex vivo images, statistical significance may be attained with a power of 0.8 and $\alpha=0.05$.

Figure 17:
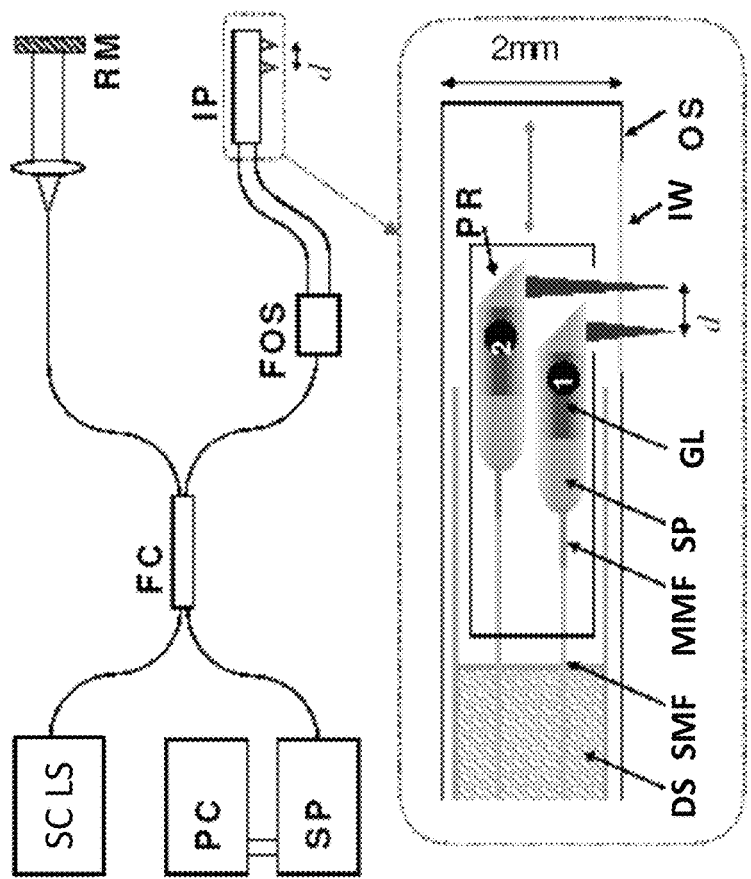
FIG. 17 shows a schematic of a DBPS-d-μOCT system (top) and endoscopic probe (bottom). Top: A conventional Michelson interferometer fiber-based spectral domain OCT system with a high-speed fiber optical switch (FOS) in the sample arm that switches between the two probe beams at the A-scan rate. SC LS-supercontinuum light source; FC-broadband fiber coupler; RM—reference mirror; FOS—fiber optical switch; IP—imaging probe; SP—spectrometer; PC—personal computer. Bottom: Mechanical linear pull-back probe housing two individual optical μOCT assemblies that achieves in plane beam separation of and EDOF via MMF self—imaging. DS—drive shaft; SMF—single mode fiber; MMF—multimode fiber; SP—spacer; GL—gradient index lens; PR—prism; IW—imaging window; OS—outer sheath.

Another embodiment of this disclosure is dual-beam phase sensitive d-μOCT (DBPS-d-μOCT) system that can be used as a hand held or endoscopic probe for imaging in vivo or ex vivo. Obtaining motility information in a single scan is critical for imaging living internal organs with small diameter endoscopic probes where precise, micrometer-level control of the beam and thus sequential imaging of the same location in the presence of motion is difficult to achieve. Intracellular motion can potentially be assessed in a single scan by measuring the phase change of light reflected from the same point in the sample over a given time interval (FIG. 8, scan mode 5). Implementation may utilize two spatially offset μOCT imaging beams (FIG. 17) that acquire two phase-resolved μOCT images of the same location separated by $\Delta t=d/v$ where vis the velocity of the scan and d is the spatial offset of the two beams. FIG. 17 shows a schematic diagram of a dual-beam phase sensitive d-μOCT (DBPS-d-μOCT) system attached to a flexible probe configured to be deployed within an endoscope's accessory port. Two μOCT fiber-based optical assemblies (SMF, MMF, GRIN, prism) that focus beams to 2 μm diameter with a 20-30×DOF extension may be mechanically coupled to a linearly translating driveshaft that may reside within the probe's 2-mm-diameter outer sheath. The optical assemblies' beams may exit a transparent window and their foci may be separated by d at the sample. A fiber-based Michelson interferometer with a high-speed fiber optical switch in the sample arm may enable dual beam μOCT imaging with a single spectrometer detection unit. Each individual μOCT image produced by each optical assembly's beam may be from alternate A-lines; for example, the image produced by assembly 1 may be from odd A-lines whereas assembly 2's image may be created from even A-lines. While this configuration halves the imaging speed, phase stability may be greatly enhanced by the use of a single detection unit that eliminates phase drifts. The d-μOCT image may be computed as the phase difference image (x, y, Δt), capable of detecting nm-level displacements. For typical values: a scanning range of 2 mm, d=1 mm, 20 KHz A-line rate, and 1 A-scan/μm sampling may result in a 1 mm long d-μOCT image with Δt=25 ms. Given a sensitivity of 90 dB and a presumed phase stability of −3 mrad (with a static mirror as a sample), DBPS-d-μOCT should be able to detect displacements of the order of −2 nm (corresponding to a phase stability of −30 mrad for lateral scanning in tissue), which may provide the same frequency resolution in a single image as 1000 images grabbed using conventional methods. This 3-order-of-magnitude gain in frequency resolution is possible due to the exquisite phase sensitivity of SDOCT. Notably, this improvement in frequency resolution can also be leveraged for ex vivo samples. Validation may occur by comparing DBPS-d-μOCT of excised upper gastrointestinal tissues to conventional (scan mode 1) d-μOCT of the same using frequency dependent ICM. Success may be defined as less than 10% variation for matching frequencies/samples.

The DBPS probe can potentially be used for obtaining endoscopie d-μOCT images in vivo in patients undergoing upper endoscopy. Normal regions and abnormalities (e.g. Barrett's mucosa) seen by video endoscopy may be identified by a clinician and imaged by d-μOCT in vivo, using the DBPS probe inserted into the scope's accessory channel, as done in prior studies conducted by the present inventors.

Computer Systems and Process

Figure 18:
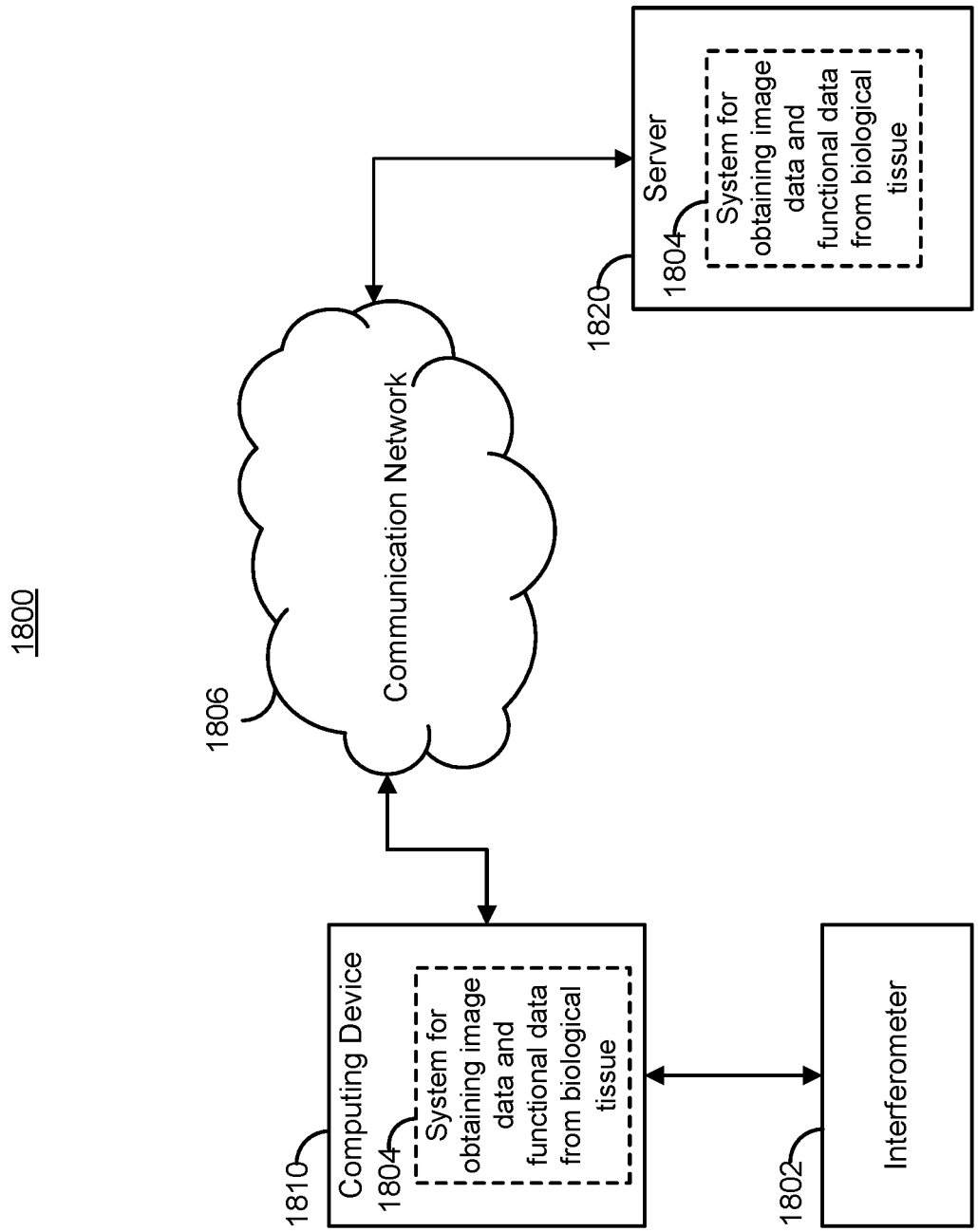
FIG. 18 shows an example of a system for obtaining image data and functional data from biological tissue in accordance with some embodiments of the disclosed subject matter.

Turning to FIG. 18, an example 1800 of a system (e.g. a data collection and processing system) for obtaining image data and functional data from biological tissue is shown in accordance with some embodiments of the disclosed subject matter. In some embodiments, a computing device 1810 can execute at least a portion of a system for obtaining image data and functional data from biological tissue 1804 and provide control signals to an interferometer 1802. Additionally or alternatively, in some embodiments, computing device 1810 can communicate information regarding the control signals to or from a server 1820 over a communication network 1806, which can execute at least a portion of system for obtaining image data and functional data from biological tissue 1804. In some such embodiments, server 1820 can return information to computing device 1810 (and/or any other suitable computing device) relating to the control signals for obtaining image data and functional data from biological tissue 1804. This information may be transmitted and/or presented to a user (e.g. a researcher, an operator, a clinician, etc.) and/or may be stored (e.g. as part of a research database or a medical record associated with a subject).

In some embodiments, computing device 1810 and/or server 1820 can be any suitable computing device or combination of devices, such as a desktop computer, a laptop computer, a smartphone, a tablet computer, a wearable computer, a server computer, a virtual machine being executed by a physical computing device, etc. As described herein, system for obtaining image data and functional data from biological tissue 1804 can present information about the control signals to a user (e.g., researcher and/or physician). In some embodiments, interferometer 1802 may include an apparatus such as that shown in FIG. 1.

In some embodiments, communication network 1806 can be any suitable communication network or combination of communication networks. For example, communication network 1806 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, etc. In some embodiments, communication network 1806 can be a local area network, a wide area network, a public network (e.g., the Internet), a private or semi-private network (e.g., a corporate or university intranet), any other suitable type of network, or any suitable combination of networks. Communications links shown in FIG. 18 can each be any suitable communications link or combination of communications links, such as wired links, fiber optic links, Wi-Fi links, Bluetooth links, cellular links, etc.

Figure 19:
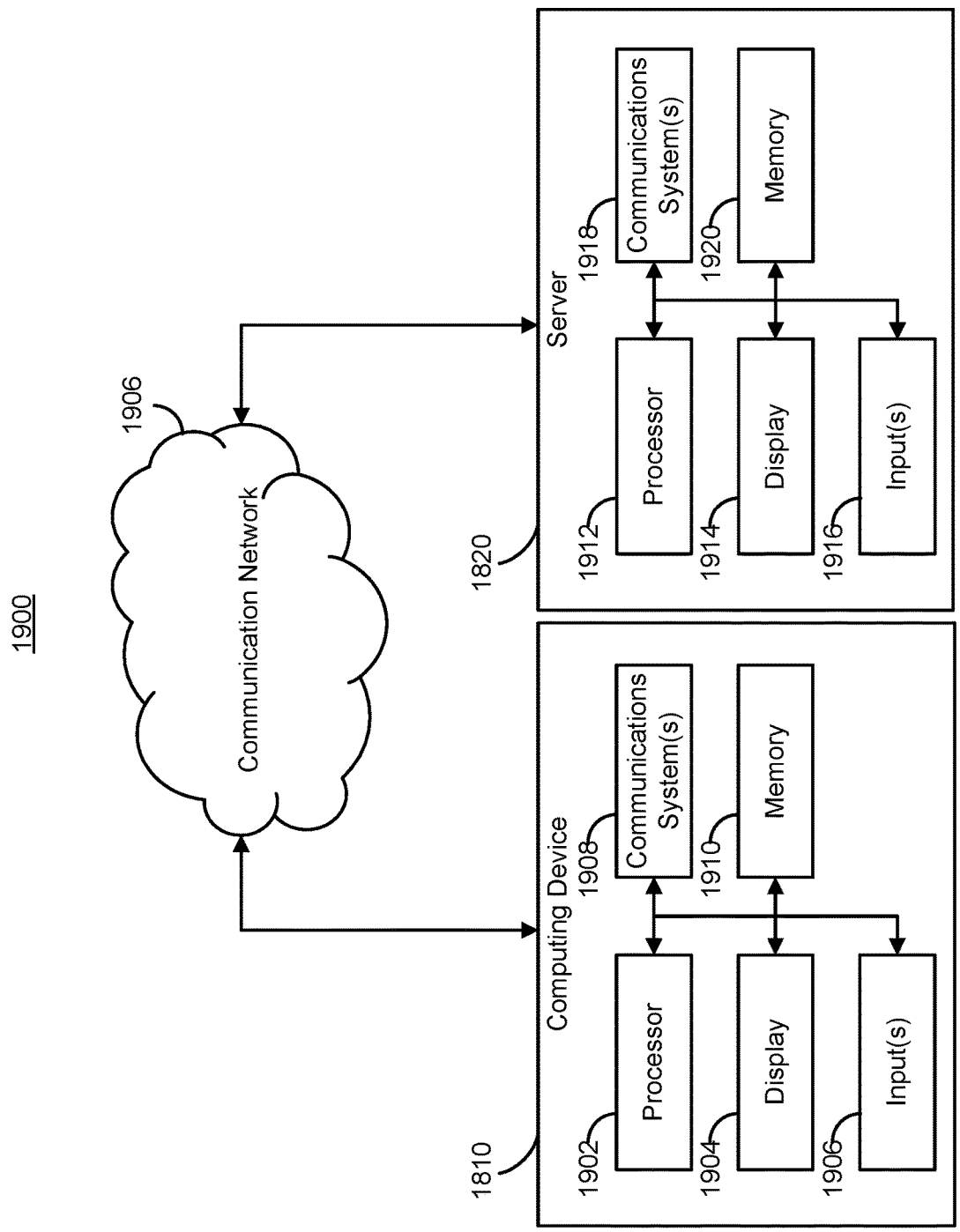
FIG. 19 shows an example of hardware that can be used to implement a computing device and server in accordance with some embodiments of the disclosed subject matter.

FIG. 19 shows an example 1900 of hardware that can be used to implement computing device 1810 and server 1820 in accordance with some embodiments of the disclosed subject matter. As shown in FIG. 19, in some embodiments, computing device 1810 can include a processor 1902, a display 1904, one or more inputs 1906, one or more communication systems 1908, and/or memory 1910. In some embodiments, processor 1902 can be any suitable hardware processor or combination of processors, such as a central processing unit, a graphics processing unit, etc. In some embodiments, display 1904 can include any suitable display devices, such as a computer monitor, a touchscreen, a television, etc. In some embodiments, inputs 1906 can include any suitable input devices and/or sensors that can be used to receive user input, such as a keyboard, a mouse, a touchscreen, a microphone, etc.

In some embodiments, communications systems 1908 can include any suitable hardware, firmware, and/or software for communicating information over communication network 1806 and/or any other suitable communication networks. For example, communications systems 1908 can include one or more transceivers, one or more communication chips and/or chip sets, etc. In a more particular example, communications systems 1908 can include hardware, firmware and/or software that can be used to establish a Wi-Fi connection, a Bluetooth connection, a cellular connection, an Ethernet connection, etc.

In some embodiments, memory 1910 can include any suitable storage device or devices that can be used to store instructions, values, etc., that can be used, for example, by processor 1902 to present content using display 1904, to communicate with server 1820 via communications system(s) 1908, etc. Memory 1910 can include any suitable volatile memory, non-volatile memory, storage, or any suitable combination thereof. For example, memory 1910 can include RAM, ROM, EEPROM, one or more flash drives, one or more hard disks, one or more solid state drives, one or more optical drives, etc. In some embodiments, memory 1910 can have encoded thereon a computer program for controlling operation of computing device 1810. In such embodiments, processor 1902 can execute at least a portion of the computer program to present content (e.g., images, user interfaces, graphics, tables, etc.), receive content from server 1820, transmit information to server 1820, etc.

In some embodiments, server 1820 can include a processor 1912, a display 1914, one or more inputs 1916, one or more communications systems 1918, and/or memory 1920. In some embodiments, processor 1912 can be any suitable hardware processor or combination of processors, such as a central processing unit, a graphics processing unit, etc. In some embodiments, display 1914 can include any suitable display devices, such as a computer monitor, a touchscreen, a television, etc. In some embodiments, inputs 1916 can include any suitable input devices and/or sensors that can be used to receive user input, such as a keyboard, a mouse, a touchscreen, a microphone, etc.

In some embodiments, communications systems 1918 can include any suitable hardware, firmware, and/or software for communicating information over communication network 1806 and/or any other suitable communication networks. For example, communications systems 1918 can include one or more transceivers, one or more communication chips and/or chip sets, etc. In a more particular example, communications systems 1918 can include hardware, firmware and/or software that can be used to establish a Wi-Fi connection, a Bluetooth connection, a cellular connection, an Ethernet connection, etc.

In some embodiments, memory 1920 can include any suitable storage device or devices that can be used to store instructions, values, etc., that can be used, for example, by processor 1912 to present content using display 1914, to communicate with one or more computing devices 1810, etc. Memory 1920 can include any suitable volatile memory, non-volatile memory, storage, or any suitable combination thereof. For example, memory 1920 can include RAM, ROM, EEPROM, one or more flash drives, one or more hard disks, one or more solid state drives, one or more optical drives, etc. In some embodiments, memory 1920 can have encoded thereon a server program for controlling operation of server 1820. In such embodiments, processor 1912 can execute at least a portion of the server program to transmit information and/or content (e.g., results of a tissue identification and/or classification, a user interface, etc.) to one or more computing devices 1810, receive information and/or content from one or more computing devices 1810, receive instructions from one or more devices (e.g., a personal computer, a laptop computer, a tablet computer, a smartphone, etc.), etc.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

Figure 20:
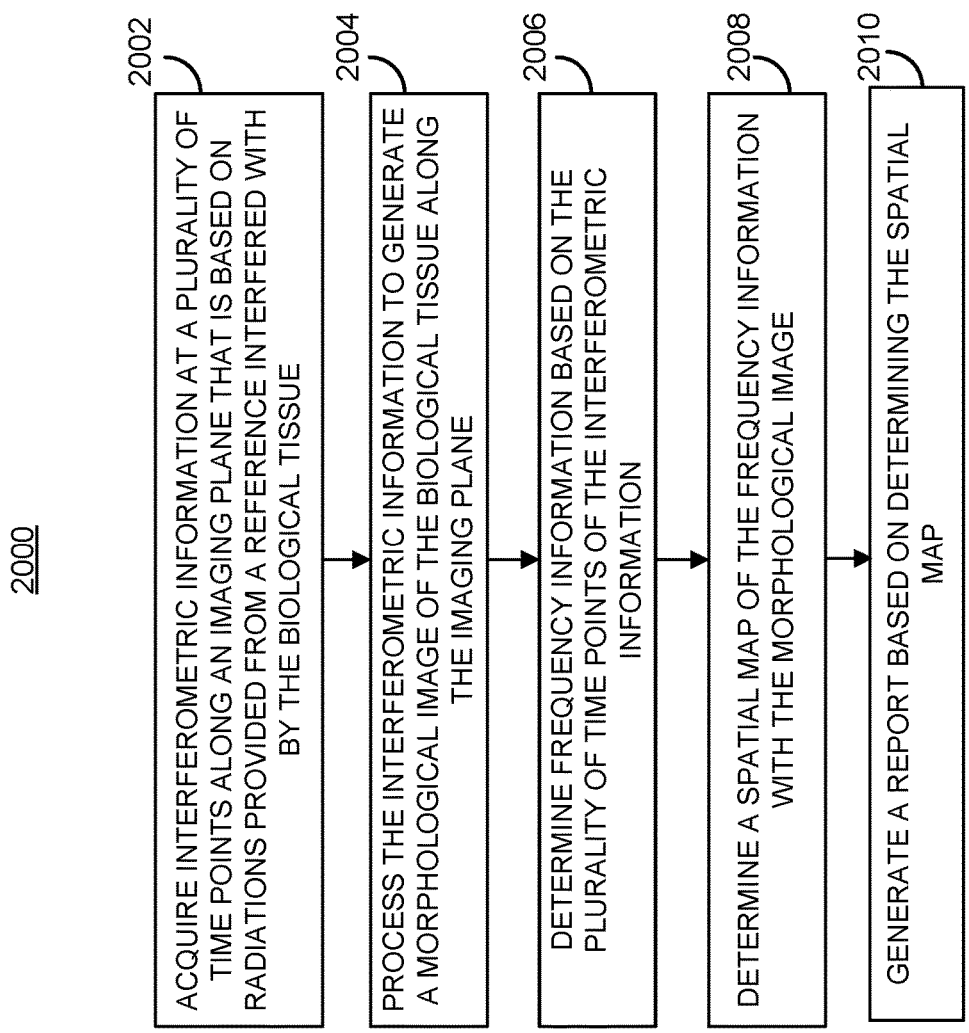
FIG. 20 shows an example of a process for obtaining image data and functional data from biological tissue in accordance with some embodiments of the disclosed subject matter.

FIG. 20 shows an example 2000 of a process for obtaining image data and functional data from biological tissue in accordance with some embodiments of the disclosed subject matter. As shown in FIG. 20, at 2002, process 2000 can acquire interferometric information at a plurality of time points along an imaging plane that is based on radiations provided from a reference interfered with by the biological tissue. The interferometric information may be acquired using an interferometer. At 2004, process 2000 can process the interferometric information to generate a morphological image of the biological tissue along the imaging plane. The processing may be performed using a processor configured to receive the interferometric information from the interferometer. At 2006, process 2000 can determine frequency information based on the plurality of time points of the interferometric information. The determination may be performed using the processor. The frequency information may reflect temporal modulations induced by dynamic functions of the biological tissue. At 2008, process 2000 can determine a spatial map of the frequency information with the morphological image. The determination may be performed using the processor. The spatial map of the frequency information may indicate the dynamic functions of the biological tissue. Finally, at 2010, process 2000 can generate a report based on determining the spatial map. The report may be generated using the processor.

It should be understood that the above described steps of the process of FIG. 20 can be executed or performed in any order or sequence not limited to the order and sequence shown and described in the figures. Also, some of the above steps of the processes of FIG. 20 can be executed or performed substantially simultaneously where appropriate or in parallel to reduce latency and processing times.

In certain embodiments, the steps of any process disclosed herein may be carried out using a processor in communication with a memory having stored thereon instructions which cause the processor to carry out the process. In some embodiments, the memory may include any suitable computer readable media which can be used for storing instructions for performing the functions and/or processes described herein. For example, in some embodiments, computer readable media can be transitory or non-transitory.

It will be appreciated by those skilled in the art that while the disclosed subject matter has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is hereby incorporated by reference, as if each such patent or publication were individually incorporated by reference herein.

Various features and advantages of the invention are set forth in the following claims.

What is claimed is:

1. An apparatus for obtaining image data and functional data from a biological sample, the apparatus comprising:
an interferometer configured to acquire interferometric information at a plurality of time points along an imaging plane for which at least one axis of the plane is at least partially along a depth or axial dimension that is based on radiations provided from a reference interfered with by the biological sample; and
a processor configured to receive the interferometric information from the interferometer and configured to:
process the interferometric information to generate an image of the biological sample along the imaging plane;
determine frequency information based on the plurality of time points of the interferometric information,
the frequency information reflecting temporal modulations of the interferometric information acquired at the plurality of time points, the temporal modulations being induced by dynamic functions of the biological sample;
generate a spatial map of the frequency information,
the spatial map of the frequency information indicating the dynamic functions of the biological sample;
perform cross-correlation between at least two image frames to measure an amount of lateral shifting; and
apply an image registration algorithm to the at least two image frames to correct for the lateral shifting.

2. The apparatus of claim 1, wherein the processor, when determining frequency information, is further configured to:
identify temporal fluctuations in the interferometric information induced by the dynamic functions of the biological sample.

3. The apparatus of claim 2, wherein the processor, when identifying temporal fluctuations, is further configured to:
conduct a power frequency analysis of the temporal fluctuations to identify fluctuations arising from intracellular motion of the biological sample.

4. The apparatus of claim 3, wherein the image comprises a plurality of subregions, and
wherein the processor is further configured to individually perform the power frequency analysis on at least one of the plurality of subregions.

5. The apparatus of claim 4, wherein the interferometer is further configured to acquire the interferometric information at a plurality of time points during a longitudinal study of at least 24 hours; and
wherein the processor is further configured to track dynamic functions of the biological sample during the longitudinal study.

6. The apparatus of claim 5, wherein a drug is applied to the biological sample during the longitudinal study.

7. The apparatus of claim 2, wherein the processor is further configured to determine an entropy of a frequency spectrum for quantifying a frequency content of signals.

8. The apparatus of claim 1, wherein the interferometer forms part of a micro optical coherence tomography (μOCT) system.

9. The apparatus of claim 1, further comprising a galvanometer configured to scan at a scan rate; and
wherein the interferometer, when acquiring interferometric information, is further configured to:
acquire the interferometric information by repeatedly scanning an imaging beam laterally across a region of interest at a frequency set by the galvanometer scan rate.

10. The apparatus of claim 1, wherein the interferometer, when acquiring interferometric information, is further configured to:
traverse the imaging beam across a lateral region of interest in a stepwise manner in a plurality of scans, and
stop at equally-spaced positions in the lateral region during each scan of the plurality of scans to acquire a series of A-lines at a rate determined by an A-line rate.

11. The apparatus of claim 1, wherein the interferometer forms part of a micro optical coherence tomography (μOCT) system, and
wherein the processor, when processing the interferometric information to generate an image of the biological sample, is further configured to:
correct for depth-dependent attenuation of μOCT intensity in an axial direction.

12. The apparatus of claim 1, wherein the processor, when determining the frequency information, is further configured to:
determine the frequency information on a subset of the plurality of time points.

13. The apparatus of claim 1, wherein the processor, when determining frequency information based on the plurality of time points, is further configured to:
determine the frequency information by performing spectral analysis on the plurality of time points based on at least one of: a power spectrum, a standard deviation, a variance, or a Fourier entropy.

14. The apparatus of claim 1, wherein the interferometer is further configured to acquire interferometric information comprising at least one of phase information or intensity information, and
wherein the processor, when processing the interferometric information to generate an image of the biological sample, is further configured to:
process the interferometric information to generate the image of the biological sample based on at least one of the phase information or the intensity information.

15. The apparatus of claim 1, wherein the processor, when determining frequency information, is further configured to:
determine the frequency information based on providing a real-time estimate of the frequency information.

16. The apparatus of claim 15, wherein the processor, when providing a real-time estimate of the frequency information, is further configured to:
provide a real-time estimate of the frequency information based on a running standard deviation or variance.

17. The apparatus of claim 1, wherein the interferometer is further configured to acquire interferometric information at a plurality of time points using a 2D scanning pattern, and
wherein the processor, when processing the interferometric information to generate an image of the biological sample, is further configured to:
process the interferometric information to generate a 3D image of the biological sample.

18. The apparatus of claim 1, wherein the interferometer is further configured to acquire interferometric information at a plurality of time points using a raster scanning pattern, and
wherein the processor, when processing the interferometric information to generate an image of the biological sample, is further configured to:
process the interferometric information to generate a 3D image of the biological sample.

19. An apparatus for obtaining image data and functional data from a biological sample, the apparatus comprising:
- an interferometer configured to acquire interferometric information at a plurality of time points along an imaging plane for which at least one axis of the plane is at least partially along a depth or axial dimension that is based on radiations provided from a reference interfered with by the biological sample; and
- a processor configured to receive the interferometric information from the interferometer and configured to:
  - process the interferometric information to generate an image of the biological sample along the imaging plane;
  - determine frequency information based on the plurality of time points of the interferometric information,
    - the frequency information reflecting temporal modulations of the interferometric information acquired at the plurality of time points, the temporal modulations being induced by dynamic functions of the biological sample; and
  - generate a spatial map of the frequency information,
    - the spatial map of the frequency information indicating the dynamic functions of the biological sample,
    - wherein the interferometric information comprises micro optical coherence tomography (µOCT) frames, and
    - wherein the processor, when processing the interferometric information to generate an image of the biological sample along the imaging plane, is further to:
      - locally normalize and Gaussian filter the µOCT frames to generate processed frames,
      - compute an elastic unwarping transformation matrix for each of the processed frames, wherein the center frame is used as a reference, and
      - apply the transformation matrices to the µOCT frames.

20. An apparatus for obtaining image data and functional data from a biological sample, the apparatus comprising:
- an interferometer configured to acquire interferometric information at a plurality of time points along an imaging plane for which at least one axis of the plane is at least partially along a depth or axial dimension that is based on radiations provided from a reference interfered with by the biological sample; and
- a processor configured to receive the interferometric information from the interferometer and configured to:
  - process the interferometric information to generate an image of the biological sample along the imaging plane;
  - determine frequency information based on the plurality of time points of the interferometric information,
    - the frequency information reflecting temporal modulations of the interferometric information acquired at the plurality of time points, the temporal modulations being induced by dynamic functions of the biological sample; and
  - generate a spatial map of the frequency information,
    - the spatial map of the frequency information indicating the dynamic functions of the biological sample; and
  - generate a super-resolution image of the biological sample based on performing Gauss-Newton nonlinear least squares minimization with hybrid bidiagonalization regularization and whole-image affine transformation geometric warping.

* * * * *